(12) United States Patent
Kaku

(10) Patent No.: US 7,173,959 B2
(45) Date of Patent: Feb. 6, 2007

(54) NOISE ELIMINATION METHOD AND APPARATUS

(75) Inventor: Takashi Kaku, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 819 days.

(21) Appl. No.: 10/331,078

(22) Filed: Dec. 27, 2002

(65) Prior Publication Data

US 2003/0210734 A1 Nov. 13, 2003

(30) Foreign Application Priority Data

May 7, 2002 (JP) .............................. 2002-131123

(51) Int. Cl.
H04B 1/00 (2006.01)
(52) U.S. Cl. ...................... 375/148; 375/150
(58) Field of Classification Search ................ 375/148, 375/346, 316, 140, 130, 147, 285, 259, 150, 375/142, 144, 343
See application file for complete search history.

(56) References Cited

U.S. PATENT DOCUMENTS

| 4,587,620 | A | * | 5/1986 | Niimi et al. ................ 702/193 |
| 4,792,964 | A | * | 12/1988 | Yoshida ....................... 375/371 |
| 6,426,983 | B1 | * | 7/2002 | Rakib et al. ................ 375/346 |

FOREIGN PATENT DOCUMENTS

| EP | 0 798 871 | 10/1997 |
| EP | 0 987 829 | 3/2000 |
| JP | 2000-164801 | 6/2000 |

OTHER PUBLICATIONS

European Search Report dated Oct. 1, 2003, for European Application EP 02 02 9036.
Young, et al., "Analysis of DFT-Based Frequency Excision Algorithims for Direct-Sequence Spread-Spectrum Communictions" IEE Transactions on Communications, vol. 46, No. 8 Aug. 1998: pp. 1076-1087, XP002253780.

* cited by examiner

Primary Examiner—Tesfaldet Bocure
Assistant Examiner—Vineeta Panwalkar
(74) Attorney, Agent, or Firm—Katten Muchin Rosenman LLP

(57) ABSTRACT

In a noise elimination method and apparatus, a spread spectrum modulation signal having a data signal and an overlapping noise component at a signal point on a time axis and a noise component at a zero point on the time axis is received. A correlation of the received modulation signal to a spread spectrum code is generated by using a correlating filter. Zero is set at points of the modulation signal other than the signal point where the correlation becomes the maximum, so that the noise component at the zero point is extracted from the modulation signal. The noise component at the signal point is predicted by performing interpolation prediction based on the extracted noise component. The noise component at the signal point is removed from the modulation signal based on the predicted noise component.

11 Claims, 27 Drawing Sheets

FIG.6

| NO | 0 | 1 | 2 | 3 | 4 | 5 | 6 | 7 | 8 | 9 | 10 | 11 | 12 | 13 | 14 | Σ |
|---|---|---|---|---|---|---|---|---|---|---|---|---|---|---|---|---|
|  | 0 | 1 | 1 | 1 | 0 | 1 | 0 | 1 | 1 | 0 | 0 | 1 | 0 | 0 | 0 |  |
| BASIC | 1 | 1 | 1 | 1 | -1 | 1 | -1 | 1 | 1 | -1 | -1 | 1 | -1 | -1 | -1 |  |
| 0TH | 1 | 1 | 1 | 1 | -1 | 1 | -1 | 1 | 1 | -1 | -1 | 1 | -1 | -1 | -1 |  |
| COR | 1 | 1 | 1 | 1 | 1 | 1 | 1 | 1 | 1 | 1 | 1 | 1 | 1 | 1 | 1 | 15 |
| BASIC | 1 | 1 | 1 | 1 | -1 | 1 | -1 | 1 | 1 | -1 | -1 | 1 | -1 | -1 | -1 |  |
| +1ST | -1 | 1 | 1 | 1 | 1 | -1 | 1 | -1 | 1 | 1 | -1 | -1 | 1 | -1 | -1 |  |
| COR | -1 | 1 | 1 | 1 | -1 | -1 | -1 | -1 | 1 | -1 | 1 | -1 | -1 | 1 | 1 | -1 |
| BASIC | 1 | 1 | 1 | 1 | -1 | 1 | -1 | 1 | 1 | -1 | -1 | 1 | -1 | -1 | -1 |  |
| +2ND | -1 | -1 | 1 | 1 | 1 | 1 | -1 | 1 | -1 | 1 | 1 | -1 | -1 | 1 | -1 |  |
| COR | -1 | -1 | 1 | 1 | -1 | 1 | 1 | 1 | -1 | -1 | 1 | -1 | 1 | -1 | 1 | -1 |
| BASIC | 1 | 1 | 1 | 1 | -1 | 1 | -1 | 1 | 1 | -1 | -1 | 1 | -1 | -1 | -1 |  |
| +3RD | -1 | -1 | -1 | 1 | 1 | 1 | 1 | -1 | 1 | -1 | 1 | 1 | -1 | -1 | 1 |  |
| COR | -1 | -1 | -1 | 1 | -1 | 1 | -1 | -1 | 1 | 1 | -1 | 1 | 1 | 1 | -1 | -1 |
| BASIC | 1 | 1 | 1 | 1 | -1 | 1 | -1 | 1 | 1 | -1 | -1 | 1 | -1 | -1 | -1 |  |
| +4TH | 1 | -1 | -1 | -1 | 1 | 1 | 1 | 1 | -1 | 1 | -1 | 1 | 1 | -1 | -1 |  |
| COR | 1 | -1 | -1 | -1 | -1 | 1 | -1 | 1 | -1 | -1 | 1 | 1 | -1 | 1 | 1 | -1 |
| BASIC | 1 | 1 | 1 | 1 | -1 | 1 | -1 | 1 | 1 | -1 | -1 | 1 | -1 | -1 | -1 |  |
| +5TH | -1 | 1 | -1 | -1 | -1 | 1 | 1 | 1 | 1 | -1 | 1 | -1 | 1 | 1 | -1 |  |
| COR | -1 | 1 | -1 | -1 | 1 | 1 | -1 | 1 | 1 | 1 | -1 | -1 | -1 | -1 | 1 | -1 |
| BASIC | 1 | 1 | 1 | 1 | -1 | 1 | -1 | 1 | 1 | -1 | -1 | 1 | -1 | -1 | -1 |  |
| +6TH | -1 | -1 | 1 | -1 | -1 | -1 | 1 | 1 | 1 | 1 | -1 | 1 | -1 | 1 | 1 |  |
| COR | -1 | -1 | 1 | -1 | 1 | -1 | -1 | 1 | 1 | -1 | 1 | 1 | 1 | -1 | -1 | -1 |
| BASIC | 1 | 1 | 1 | 1 | -1 | 1 | -1 | 1 | 1 | -1 | -1 | 1 | -1 | -1 | -1 |  |
| +7TH | 1 | -1 | -1 | 1 | -1 | -1 | -1 | 1 | 1 | 1 | 1 | -1 | 1 | -1 | 1 |  |
| COR | 1 | -1 | -1 | 1 | 1 | -1 | 1 | 1 | 1 | -1 | -1 | -1 | -1 | 1 | -1 | -1 |

| NO | 0 | 1 | 2 | 3 | 4 | 5 | 6 | 7 | 8 | 9 | 10 | 11 | 12 | 13 | 14 | Σ |
|---|---|---|---|---|---|---|---|---|---|---|---|---|---|---|---|---|
|  | 0 | 1 | 1 | 1 | 0 | 1 | 0 | 1 | 1 | 0 | 0 | 1 | 0 | 0 | 0 |  |
| BASIC | 1 | 1 | 1 | 1 | -1 | 1 | -1 | 1 | 1 | -1 | -1 | 1 | -1 | -1 | -1 |  |
| +8TH | 1 | 1 | -1 | -1 | 1 | -1 | -1 | -1 | 1 | 1 | 1 | 1 | -1 | 1 | -1 |  |
| COR | 1 | 1 | -1 | -1 | -1 | -1 | 1 | -1 | 1 | -1 | -1 | 1 | 1 | -1 | 1 | -1 |
| BASIC | 1 | 1 | 1 | 1 | -1 | 1 | -1 | 1 | 1 | -1 | -1 | 1 | -1 | -1 | -1 |  |
| +9TH | -1 | 1 | 1 | -1 | -1 | 1 | -1 | -1 | -1 | 1 | 1 | 1 | 1 | -1 | 1 |  |
| COR | -1 | 1 | 1 | -1 | 1 | 1 | 1 | -1 | -1 | -1 | -1 | 1 | -1 | 1 | -1 | -1 |
| BASIC | 1 | 1 | 1 | 1 | -1 | 1 | -1 | 1 | 1 | -1 | -1 | 1 | -1 | -1 | -1 |  |
| +10TH | 1 | -1 | 1 | 1 | -1 | -1 | 1 | -1 | -1 | -1 | 1 | 1 | 1 | 1 | -1 |  |
| COR | 1 | -1 | 1 | 1 | 1 | -1 | -1 | -1 | -1 | 1 | -1 | 1 | -1 | -1 | 1 | -1 |
| BASIC | 1 | 1 | 1 | 1 | -1 | 1 | -1 | 1 | 1 | -1 | -1 | 1 | -1 | -1 | -1 |  |
| +11TH | -1 | 1 | -1 | 1 | 1 | -1 | -1 | 1 | -1 | -1 | -1 | 1 | 1 | 1 | 1 |  |
| COR | -1 | 1 | -1 | 1 | -1 | -1 | 1 | 1 | -1 | 1 | 1 | 1 | -1 | -1 | -1 | -1 |
| BASIC | 1 | 1 | 1 | 1 | -1 | 1 | -1 | 1 | 1 | -1 | -1 | 1 | -1 | -1 | -1 |  |
| +12TH | 1 | -1 | 1 | -1 | 1 | 1 | -1 | -1 | 1 | -1 | -1 | -1 | 1 | 1 | 1 |  |
| COR | 1 | -1 | 1 | -1 | -1 | 1 | 1 | -1 | 1 | 1 | 1 | -1 | -1 | -1 | -1 | -1 |
| BASIC | 1 | 1 | 1 | 1 | -1 | 1 | -1 | 1 | 1 | -1 | -1 | 1 | -1 | -1 | -1 |  |
| +13TH | 1 | 1 | -1 | 1 | -1 | 1 | 1 | -1 | -1 | 1 | -1 | -1 | -1 | 1 | 1 |  |
| COR | 1 | 1 | -1 | 1 | 1 | 1 | -1 | -1 | -1 | -1 | 1 | -1 | 1 | -1 | -1 | -1 |
| BASIC | 1 | 1 | 1 | 1 | -1 | 1 | -1 | 1 | 1 | -1 | -1 | 1 | -1 | -1 | -1 |  |
| +14TH | 1 | 1 | 1 | -1 | 1 | -1 | 1 | 1 | -1 | -1 | 1 | -1 | -1 | -1 | 1 |  |
| COR | 1 | 1 | 1 | -1 | -1 | -1 | -1 | 1 | -1 | 1 | -1 | -1 | 1 | 1 | -1 | -1 |
| BASIC | 1 | 1 | 1 | 1 | -1 | 1 | -1 | 1 | 1 | -1 | -1 | 1 | -1 | -1 | -1 |  |
| +0TH | 1 | 1 | 1 | 1 | -1 | 1 | -1 | 1 | 1 | -1 | -1 | 1 | -1 | -1 | -1 |  |
| COR | 1 | 1 | 1 | 1 | 1 | 1 | 1 | 1 | 1 | 1 | 1 | 1 | 1 | 1 | 1 | 15 |

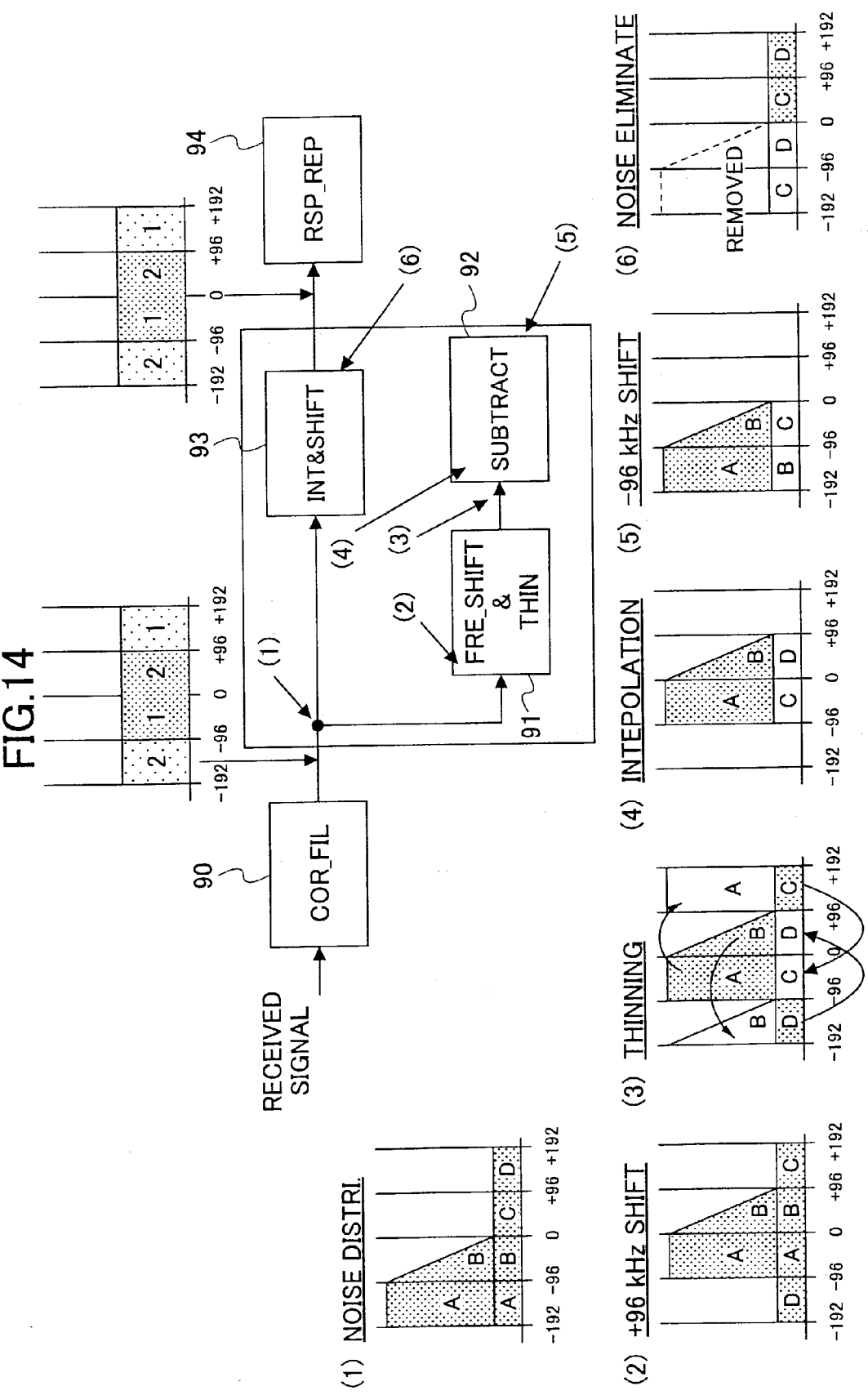

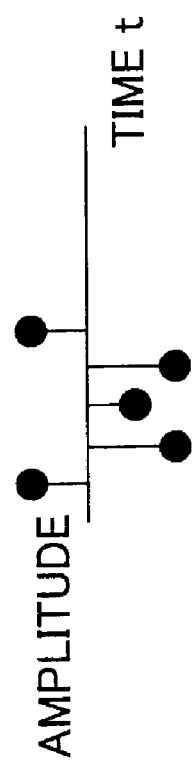
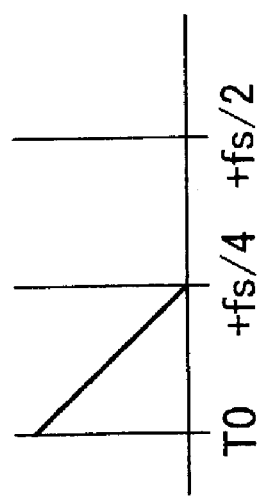
FIG.17A
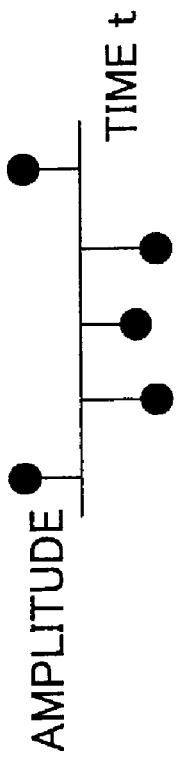
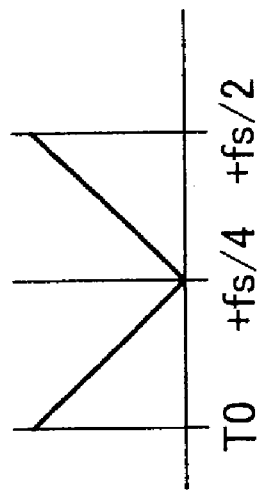
FIG.17B

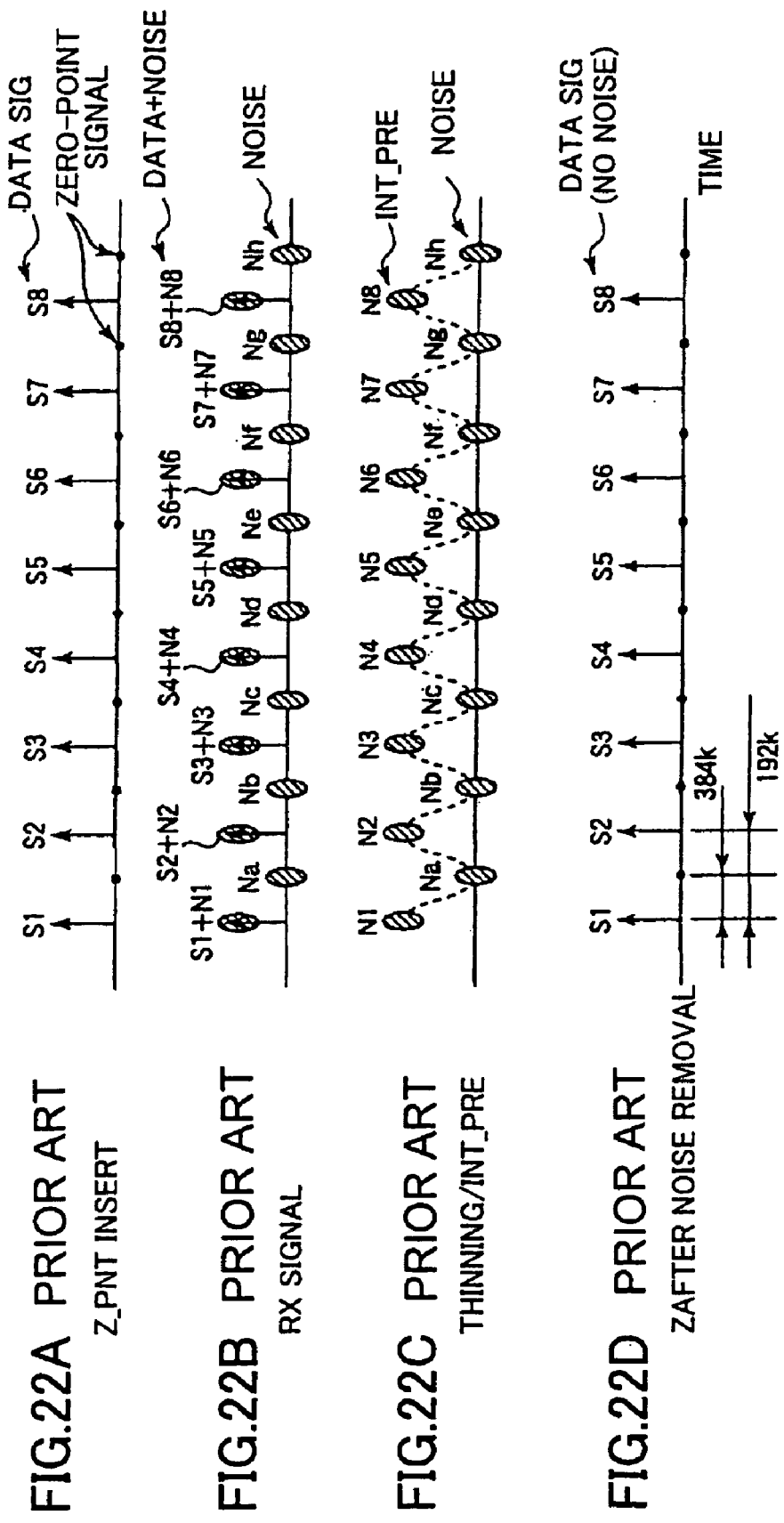
FIG.22A PRIOR ART Z_PNT INSERT
FIG.22B PRIOR ART RX SIGNAL
FIG.22C PRIOR ART THINNING/INT_PRE
FIG.22D PRIOR ART AFTER NOISE REMOVAL

Z_PNT FOR EVERY 3 SIG PNTS

Z_PNT FOR EVERY 2 SIG PNTS

Z_PNT FOR EVERY SIG PNT

2 Z_PNTS FOR EVERY SIG PNT

3 Z_PNTS FOR EVERY SIG PNT

FIG.25  PRIOR ART

| OBJECTIVE | QAM | SS | CDMA | MC | OFDM | REMARKS |
|---|---|---|---|---|---|---|
| HIGH SPEED TRANSMIT | ○ | ▲ | ○ | ▲ | ○ | |
| MULTIPLE PATH | ▲ | ○ | ○ | ○ | ○ | |
| WAVEFORM EQUALIZATION | ▲ | ▲ | ▲ | ○ | ○ | DEL_DET |
| SMALL-AMPLITUDE NOISE | ○ | ○ | ○ | ○ | ○ | |
| MEDIUM-AMPLITUDE NOISE | ▲ | ○ | ○ | ○ | ○ | |
| LARGE-AMPLITUDE NOISE | ▲ | ▲ | ▲ | ○ | ▲ | NOISE CANCEL |
| LOW COST PRODUCTION | ○ | ○ | ○ | ○ | ○ | LSI |
| LOW POWER CONSUMPTION | ○ | ○ | ○ | ○ | ○ | LSI |

▲ INADEQUATE   ○ ADEQUATE

NOISE ELIMINATION METHOD AND APPARATUS

BACKGROUND OF THE INVENTION

1. Field of the Invention

The present invention relates to a noise elimination method and apparatus which eliminate noises included in various kinds of transmission data or reproduction data, in order to produce the reconstructed data without error.

The noise elimination method and apparatus of the present invention are applicable to various fields of technology. If a device for producing the reconstructed data from the received data signal is defined to be a modem in a broad sense, the present invention is applicable to modems of power-line-carrier communication systems, the xDSL modems including ADSL (asymmetric digital subscriber line) modems or etc., and modems of short-distance radio communication systems based on the standards IEEE 802.11a, IEEE 802.11b, etc. Moreover, the present invention is applicable to bar code readers which print and read the data with the scanner, and magnetic or optical disk devices which store and reproduce the data, and these devices are also a kind of the modem in the broad sense.

2. Description of the Related Art

Hereinafter, the power-line-carrier communication system will be described as an example of the communication system under highly noisy environment.

FIG. 18 shows a power-line-carrier communication system as the example of the communication system under highly noisy environment.

As shown in FIG. 18, the access node 102 is provided in the distributing substation 101, for example, in the power-line-carrier communication system. The optical fiber 103 from the access node 102 is installed along with the 6 kV high-voltage power line, and the high-voltage power line is linked with the transformer 105 on the utility-line pole. The transformer 105 serves to transform the 6 kV high voltage into 100V or 200V, and distribute the electricity through the low voltage power line 106 to each home.

The power line carrier modem 104 is provided at the location of the transformer 105, and the modem 104 performs modulation/demodulation and relaying of the data transmitted between the optical fiber 103 and the low-voltage power line 106.

The incoming line 107 from the low-voltage power line 106 is connected with the panel board 108 of each home. For example, at each home premises, the refrigerator 111, the facsimile apparatus 112, the air-conditioner 113, and the plug socket 110 are connected with the interior-distribution line 109 from the panel board 108. The modem 114 is connected to the plug socket 110 via the power cable, and connected to the personal computer 115 via the LAN (local area network) cable of 10 BASE-T.

In the above-described configuration, the transmission of the data between the modem 114 (connected to the personal computer 115) and the power-line carrier modem 104 is carried out by the power-line-carrier communication, and the transmission of the data between the power-line carrier modem 104 and the access node 102 is carried out by the optical fiber communication. This configuration makes possible the Internet connection of the personal computer 115 and the centralized control of the household-electric-appliance devices.

The commonly used installation is that the low-voltage power line 106 is connected with the incoming lines 107 to 30 houses, and the low-voltage power line 106 and the interior-distribution line 109, which are equivalent to the transmission line of the power-line-carrier communication system, usually have complicated transmission characteristics. Moreover, the inverter control composition of the various household-electric-appliance devices such as the air-conditioner 113 has increased, and the noise component which is included in the interior-distribution line 109 will become very large.

As for the transmission bandwidth of the power-line-carrier communication system, the kilohertz (kHz) band tends to be influenced by the impedance or the noise of the household-electric-appliance devices, and the band in that case is restricted to 450 kHz or less. Hence, the transmission speed of the kilohertz band becomes low. On the other hand, the allowance value of the leakage electric field for the megahertz (MHz) band is severe, and a part of the application area is restricted. However, using the wide band is possible, and the high-speed transmission of the megahertz band is possible.

Generally, it is considered that the spread spectrum (SS) communication is little influenced by the noise component. FIG. 19A, FIG. 19B, FIG. 19C and FIG. 19D show the concept of the spread spectrum communication.

FIG. 19A shows the outline of the transmitter unit and the receiver unit of the spread spectrum (SS) communication system. In the transmitter unit, the data modulation unit (DATA_MOD) 121 performs the digital modulation as a primary modulation of the information, such as the voice, the picture, the data, etc. The SS modulation unit (SS_MOD) 122 performs the SS modulation as a secondary modulation of the information with the SS code from the SS code generation unit (SS_CODE_GEN) 123. The SS modulation unit 122 transmits a data signal obtained by the SS modulation.

In this case, the data signal obtained by the spread spectrum modulation is modulated to the radio frequency, and it is transmitted from the antenna of the SS modulation unit 122. The antenna of the receive unit receives the data signal sent from the transmitter unit. In the receiver unit, the SS demodulation unit (SS_DEM) 124 performs the reverse SS demodulation of the received data signal with the SS code from the SS code generation unit (SS_CODE_GEN) 126. The data demodulation unit (DATA_DEM) 125 performs the digital demodulation of the data signal from the SS demodulation unit 124 so that the reconstructed data is produced.

FIG. 19B shows the configuration of the SS modulation unit 122 which is constituted by the multiplier 127, and FIG. 19C shows operation of the SS modulation unit 122 of FIG. 19B.

As shown in FIG. 19B, the digital modulation signal (a) of the amplitude of ±1 and the SS code (b) of ±1, both shown in FIG. 19C, are sent to the inputs of the multiplier 127, and the multiplier 127 performs the multiplication of the signal (a) and the signal (b), and outputs the SS modulation signal (c) which has the amplitude of ±1 shown in FIG. 19C.

FIG. 19D shows the power flux density for the frequency before the spreading on the left-hand side and the power flux density for the frequency after the spreading on the right-hand side. As shown in FIG. 19D, the power flux density of the SS modulation signal after the spreading is diffused over the frequencies in the wide range.

The practical specification of the power-line-carrier communication system to which the above-mentioned spread spectrum communication is applied is as follows: the transmission rate is 9600 bps, the transmitter unit using the primary modulation of DPSK (differentia phase shift keying) and the secondary modulation of DS-SS (direct spread-spread spectrum), and the receiver unit using the frequency band of 150–350 kHz, the band-division delayed detection of the primary and secondary demodulation, and the power flux density of 10 mW/10 kHz or less. The shape of the transmission power envelop is flat with respect to the frequency axis. The SS code is the mesa-type envelope generation code. The receiving sensitivity is 60 dB μV or less.

FIG. 20 shows a conventional modem to which the above-mentioned spread spectrum communication is applied.

In FIG. 20, reference numeral 131 is the differential coding unit (DIF_COD), reference numeral 132 is the SS modulation unit (SS_MOD), reference numeral 133 is the SS code generation unit (SS_CODE_GEN), reference numeral 134 is the digital-to-analog converter (DAC), reference numeral 135 is the band pass filter (BPF), reference numeral 136 is the amplifier (AMP), reference numeral 137 is the coupling unit, reference numeral 138 is the band pass filter (BPF), reference numeral 139 is the analog-to-digital converter (ADC), reference numerals 140-1 to 140-n are the band pass filters (BPF), reference numerals 141-1 to 141-n are the delayed detection units (DEL_DET), and reference numeral 142 is the multiplexer. Moreover, in FIG. 20, SD is the transmitting data signal, RD is the received data signal, CLK is the clock signal, and AC is the interior-distribution line of the alternating current.

In the transmitter unit of the conventional modem of FIG. 20, the differential coding unit 131 performs the differential coding of the transmitting data signal SD. The SS modulation unit 132 performs the SS modulation of the digital modulation signal by multiplication of the SS code from the SS code generation unit 133. The DAC 134 converts the SS modulation signal from the SS modulation unit 132 into the analog signal. The BPF 135 removes the undesired frequency component from the analog signal sent by the DAC 134. The amplifier 136 amplifies the data signal sent by the BPF 135, and sends out the amplified data signal to the interior-distribution line AC via the coupling unit 137 as the SS modulation signal. The coupling unit 137 includes the high frequency transformer, the capacitor, etc.

In the receiver unit of the conventional modem of FIG. 20, the BPF 138 removes the undesired frequency component from the received data signal received from the interior-distribution line AC via the coupling unit 137. The ADC 139 converts the analog signal sent by the BPF 138 into the digital signal. The ADC 139 divides the SS band into "n" frequency ranges. Each of the BPF 140-1 to 140-n has the center frequency of one of the "n" frequency bands as the pass-band frequency. Each of the BPF 140-1 to 140-n output the "n" signal components in the SS band.

Moreover, the delayed detection units 141-1 to 141-n perform the delayed detection of the signals sent by the BPF 140-1 to 140-n. The multiplexer 142 performs the multiplexing of the signal components sent by the delayed detection units 141-1 to 141-n, and outputs the received data signal RD and the clock signal CLK.

In the spread spectrum communication, the noise component is dispersed within the transmission band and included in the SS modulation signal. The correlation value of the SS modulation signal with the SS code becomes zero through the reverse SS demodulation process. Since the correlation with the SS code is taken, the SS communication system is little influenced by the noise component.

However, when it is applied to the power-line-carrier communication system, the characteristics of the transmission line are indefinite and vary. The noise, which is accompanied with the switching noise and the load fluctuation effect by the inverters, is included. There may be the case where the noise component is larger in amplitude than the signal component.

In such a case, even if the delayed detection of the received SS modulation signal is carried by using the frequency region correspondence, the influence by the noise component is large and it is difficult to produce the reconstructed data signal without error.

In order to overcome the above problem, Japanese Laid-Open Patent Application No. 2000-164801 discloses a noise elimination apparatus which enables high-speed data transmission of the power-line-carrier communication system without error by eliminating the noise from the received SS modulation signal.

FIG. 21 shows a conventional noise elimination apparatus disclosed by the above-mentioned document.

As shown in FIG. 21, the transmitting-signal point generating unit (TX_SIG_PNT GENE) 151 generates the signal point corresponding to the transmitting data signal. For example, suppose the case where the signal point as in the 4 phase modulation to the I axis and the Q axis is given as in (1) the data signal point.

Next, the zero-point insertion unit (Z_PNT INSERT) 152 inserts the zero point to the transmitting data signal. By the zero-point insertion, the zero point inserted appears at the center of the I-axis and the Q-axis of the transmitting data signal as in (2) the data+zero point.

The transmission path (TRANS PATH) 153 is the transmission line in the above-mentioned power-line-carrier communication system, and the transmission path 153 shows the noise spectrum in that case. As shown in FIG. 21, the noise component of 150 kHz or less is very large in the transmission path 153. Hence, the signal point will be in the unknown state due to the large-amplitude noise component so that the signal delivered through the transmission path 153 is as in (4) the data+zero-point+noise.

Then, the noise component which is overlapped at the zero point is extracted by the zero-point thinning unit (Z_PNT THINNING) 155. The noise component on the signal point is predicted by the interpolation prediction unit (INT_PRE) 156, and the noise component on the signal point is removed by the noise elimination unit (NOI_ELI) 154.

As in (5) the data signal point, the receiving signal point which is the same as (1) the data signal point can be obtained at the receiving signal point reproduction unit (RX_SIG_PNT REPR) 157. Hence, the receiving signal point reproduction unit 157 can produce the reconstructed data signal without error.

FIG. 22A, FIG. 22B, FIG. 22C and FIG. 22D show the noise elimination operation of the apparatus of FIG. 21.

In the zero-point insertion unit 152, zero is inserted at the signal points of the data signals S1, S2, etc. on the time axis, as in the transmitting zero-point insertion of FIG. 22A. When the transmission frequency is 192 kHz, the frequency of the zero-point inserted signal is doubled to 384 kHz by the zero point insertion.

As in the received signal of FIG. 22B, the noise components N1, N2, etc. are included at the data signals S1, S2, etc., and the noise components Na, Nb, etc. are included at the zero points between them.

The zero-point thinning unit 155 and the interpolation predicting unit 156 carry out the noise extraction and the interpolation prediction. As in the thinning and interpolation prediction of FIG. 22C, the noise components Na, Nb, etc.

at the zero points are extracted, and the noise components N1, N2, etc. included at the signal points S1, S2, etc. are determined by the interpolation prediction processing by using the extracted noise components Na, Nb, etc.

Thus, as in the state after the noise removal of FIG. 22D, the data signal (S1, S2, etc.) can be obtained by eliminating the noise components N1, N2, etc. from the received signal of FIG. 22B. The noise components N1, N2, etc. are determined by the interpolation prediction processing as mentioned above.

The zero-point insertion can be performed in various manners. FIG. 23A, FIG. 23B, FIG. 23C, FIG. 23D and FIG. 23E show various methods of the zero-point insertion.

FIG. 23A shows the method of inserting a zero point for every three signal points. FIG. 23B shows the method of inserting a zero point for every two signal points. FIG. 23C shows the method of inserting a zero point for every signal point. FIG. 23D shows the method of inserting two zero points for every signal point. FIG. 23E shows the method of inserting three zero points for every signal point.

The effect of noise elimination becomes large as the number of the zero points inserted increases. However, the transmission frequency bandwidth becomes large as the number of the zero points inserted increases. Moreover, if the transmission frequency bandwidth remains unchanged, the transmission speed becomes low.

FIG. 24A shows the configuration of a modem to which the zero-point insertion is applied. FIG. 24B shows an example of the signal waveform of the modem of FIG. 24A.

In FIG. 24A, SD is the transmitting data signal, reference numeral 241 is the conversion unit (SCR S/P) which includes the scramble processing unit (SCR) and the serial/parallel conversion unit (S/P), reference numeral 242 is the code-conversion unit (G/N SUM) which includes the gray-code/natural-code conversion unit (G/N) and the code summing processing unit (SUM), reference numeral 243 is the signal point generating unit (SIG_PNT GENE) which generates the signal point based on the signal which is obtained through the serial/parallel conversion and the code conversion, reference numeral 244 is the roll-off filter (ROF), reference numeral 245 is the digital-to-analog converter (D/A), reference numeral 246 is the low pass filter and modulation unit (LPF MOD), reference numeral 247 is the band pass filter (BPF), reference numeral 248 is the transmitting clock generating unit (TX-CLK), and TX-line is the transmission line.

Moreover, in FIG. 24A, RX-line is the receiving line, reference numeral 251 is the band pass filter (BPF), reference numeral 252 is the demodulation and low pass filter unit (DEM_LPF), reference numeral 253 is the analog-to-digital converter (A/D), reference numeral 254 is the roll-off filter (ROF), reference numeral 256 is the timing extraction unit (TIM), reference numeral 257 is the phase synch oscillation unit (PLL VCXO), reference numeral 258 is the receiving clock generating unit (RX-CLK), reference numeral 259 is the equalization unit (EQL), reference numeral 260 is the carrier automatic phase-control unit (CAPC), reference numeral 261 is the decision unit (DEC), reference numeral 262 is the code conversion unit (DIF N/G) including the difference processing unit (DIF) and the natural-code/gray-code conversion unit (N/G), reference numeral 263 is the conversion unit (P/S DSCR) including the parallel/serial conversion unit (P/S) and the descramble processing unit (DSCR), and RD is the received data signal.

In the transmitter unit of the modem of FIG. 24A, the conversion unit 241 performs the scramble processing of the transmitting data signal SD, and converts the data signal after the scramble processing into the parallel data corresponding to the modulating-signal points. The code conversion unit 242 converts the gray code into the natural code, and performs the summing processing of the natural code such that the demodulation is possible without being influenced by the demodulation reference phase.

The signal point generating unit 243 generates the signal points in conformity with the modulating-signal points. The roll-off filter 244 removes the high-frequency components from the data signal. The D/A converter 245 converts the digital signal into the analog signal. The analog signal is passed through the low pass filter (LPF), and the resulting signal is inputted to the modulation unit (MOD) 246. The modulation unit performs the modulation of the input analog signal. The band pass filter 247 restricts the frequency of the modulated signal to the transmitting band. The resulting data signal from the band pass filter 247 is sent to the transmitting line TX-line.

In the receiver unit of the modem of FIG. 24A, the band pass filter 251 removes the undesired frequency component from the received data signal received through the receiving line RX-line. The data signal from the BPF 251 is sent to the conversion unit 252. In the conversion unit 252, the demodulation part (DEM) performs the demodulation of the received data signal, and the low pass filter (LPF) removes the high-frequency component from the demodulated signal. The A/D converter 253 converts the analog signal into the digital signal.

The digital signal is passed through the roll off filter 254 and sent to the equalization unit 259. The equalization unit 259 performs the equalization of the waveform of the received data signal. The carrier automatic phase-control unit 260 performs the phase adjustment of the received data signal. The decision unit 261 determines the data in the received data signal. The code conversion unit 262 performs the difference processing with respect to the summing processing performed by the transmitter unit, and performs the natural-code/gray-code transform processing. The conversion unit 263 converts the parallel code into the serial code, and performs the descramble processing of the serial code so that the reconstructed data is produced as the received data signal RD.

The modulation unit 246 includes the QAM (quadrature amplitude modulation) unit, such as the 64 QAM modulator, and the demodulation unit 252 includes the QAM demodulation unit, such as the 64 QAM demodulator. The portion of the modem, indicated by the dotted line in FIG. 24A, including the transmitting line TX-line and the receiving line RX-line, is constructed as the QAM path having the functions of the QAM modulation and demodulation.

As shown in FIG. 24B, the waveform of the signal indicates that, except for the peak points of the signal, the signal is transmitted at the transmission rate, the transmission rate corresponding to the Nyquist interval at which the zero point appears at the fixed period. The arrows in FIG. 24B indicate the data corresponding to the signal points where the amplitude of the signal is equal to the peak amplitude.

Various kinds of electrical machinery and apparatus are arranged in the domestic or home environment, and they are connected with the low-voltage interior-distribution line which is 100V or 200V. There has been proposed a home network which uses the interior-distribution line as the transmission line. The above-mentioned power-line-carrier communication system is applicable to the proposed network. Moreover, various kinds of sensors, such as a fire detection sensor making use of the detection of smoke, temperature, etc., a gas leakage detection sensor, and an intrusion detection sensor are arranged in the domestic or home environment. There has also been proposed to connect such sensors to the home network.

Furthermore, various kinds of home service systems which are described as in the following can be realized by using the home network and the low-voltage power line, which are connected to a certain service center via the radio circuits or the telephone line.

(a) The remote maintenance service system which performs remote maintenance and troubleshooting of the home devices.

(b) The mobile service system which is accessed from a portable telephone, etc. and performs remote monitoring and manipulation of the home devices.

(c) The energy service system which performs remote monitoring of the amount or the charge of the electricity used, and energy-saving operation control, etc.

(d) The living assisting service system which performs the centralized control and operation of the light-proof blind, the ventilating fan, and the lighting etc.

(e) The home health service system which is connected to the medial institution and performs health management and physical state management of elderly people.

(f) The security service system which performs fire prevention, the disaster prevention, the crime prevention, etc., by transmitting the detected information of the home sensors.

FIG. 25 shows the problems of various data transmission methods in the case of the home service systems.

As shown in FIG. 25, when the QAM (quadrature amplitude modulation), the SS (spread spectrum), the CDMA (code division multiple access), the MC (multiple carrier), and OFDM (orthogonal frequency division multiplex) methods are used as a means of data transmission, the possibility of high speed transmission, the influence of multiple path, the ease of waveform equalization, the influence of noises, low-cost production, and low power consumption become the subjects that have to be solved. Among these subjects, it is very important to solve the influence of the large-amplitude noise.

As mentioned above, the use of inverter control increases and the household-electric-appliance devices serves as the noise source by the inverter switching control. Moreover, the electrical machinery and apparatus which generate the electromagnetic waves, such as the electromagnetic-induction rice cooker, is increasing.

Therefore, when the home network is configured with such household-electric-appliance devices, the large-amplitude noise will be included in various kinds of data and the noise-included data signal will be transmitted.

In this case, although the interpolation prediction can be carried out and the noise on which the signal point is overlapped by inserting the zero point by the transmitting side and extracting the noise on which the zero point is overlapped can be removed, in the state where the device which inserts the zero point in the transmitting side has not spread, it is necessary to perform noise cancellation by the receiving side.

However, the data receiving processing which is carried out for the noise elimination when the large amplitude noise is included in the received data signal is not provided by the conventional noise elimination method.

SUMMARY OF THE INVENTION

An object of the present invention is to provide an improved noise elimination method and apparatus in which the above-described problems are eliminated.

Another object of the present invention is to provide a noise elimination method which enables the data receiving processing that produces the reconstructed data without error by the elimination of the large amplitude noise included in the received data signal which is transmitted through the spread spectrum communication.

Another object of the present invention is to provide a noise elimination apparatus which enables the data receiving processing that produces the reconstructed data without error by the elimination of the large amplitude noise included in the received data signal which is transmitted through the spread spectrum communication.

The above-mentioned objects of the present invention are achieved by a noise elimination method comprising the steps of: receiving a transmitted spread spectrum modulation signal, the modulation signal having a data signal and a noise component at a signal point on a time axis and having a noise component at a zero point on the time axis; generating a correlation of the received modulation signal to a spread spectrum code by using a correlating filter; setting zero at points of the received modulation signal other than the signal point where the correlation becomes the maximum, so that the noise component at the zero point is extracted from the received modulation signal; predicting the noise component at the signal point by performing interpolation prediction based on the extracted noise component; and removing the noise component at the signal point from the received modulation signal based on the predicted noise component.

The above-mentioned objects of the present invention are achieved by a noise elimination apparatus which receives a transmitted spread spectrum modulation signal, the modulation signal having a data signal and a noise component at a signal point on a time axis and having a noise component at a zero point on the time axis, the noise elimination apparatus comprising: a correlating filter unit generating a correlation of the received modulation signal to a spread spectrum code by using a correlating filter; a thinning unit setting zero at points of the received modulation signal other than the signal point where the correlation becomes the maximum, so that the noise component at the zero point is extracted from the received modulation signal; an interpolation predicting unit predicting the noise component at the signal point by performing interpolation prediction based on the extracted noise component; and a subtraction unit removing the noise component at the signal point from the received modulation signal based on the predicted noise component.

According to the noise elimination method and apparatus of the present invention, the correlating-filter unit provides the correlation of the spread spectrum (SS) modulation signal and the SS code, and sets the zero point to the signal except for the signal point where the correlation becomes the maximum. The noise component on the zero point is extracted, and the noise component on the signal point is predicted through interpolation prediction. By using the predicted noise component, the noise component on the signal point is removed.

Unlike the conventional noise elimination function, even if the zero-point insertion on the transmitter section is not performed, the large-amplitude noise included in the received data signal point can be removed.

According to the present invention, the phase equalization is performed by the timing interpolation unit, and the noise elimination method and apparatus of the present invention make it possible to perform the noise elimination more easily.

The noise elimination method and apparatus of the present invention are applicable to not only the modem of the power-line-carrier communication system but also the model of another communication system under highly noisy environment.

Moreover, according to the present invention, the phase equalization is performed by the timing interpolation unit, and the noise elimination and the error-rate reduction can be carried out more steadily.

Furthermore, the noise elimination unit is configured so that it passes only the noise component by using a simple band-pass filter, in order to remove the noise component included in the received data signal. The present invention makes it possible to carry out the noise elimination by using a simple configuration of the noise elimination apparatus.

BRIEF DESCRIPTION OF THE DRAWINGS

Other objects, features and advantages of the present invention will become apparent from the following detailed description when read in conjunction with the accompanying drawings.

FIG. 6 is a diagram showing an example of the correlation result of the correlating-filter unit of FIG. 5.

FIG. 14 is a diagram for explaining operation of the noise elimination unit of the present invention.

FIG. 17A and FIG. 17B are diagrams for explaining interpolation processing.

FIG. 22A, FIG. 22B, FIG. 22C and FIG. 22D are diagrams for explaining the noise elimination operation of the apparatus of FIG. 21.

FIG. 25 is a diagram for explaining the problems of the various data transmission methods.

DETAILED DESCRIPTION OF PREFERRED EMBODIMENTS

A description will now be given of preferred embodiments of the present invention with reference to the accompanying drawings.

Figure 1:
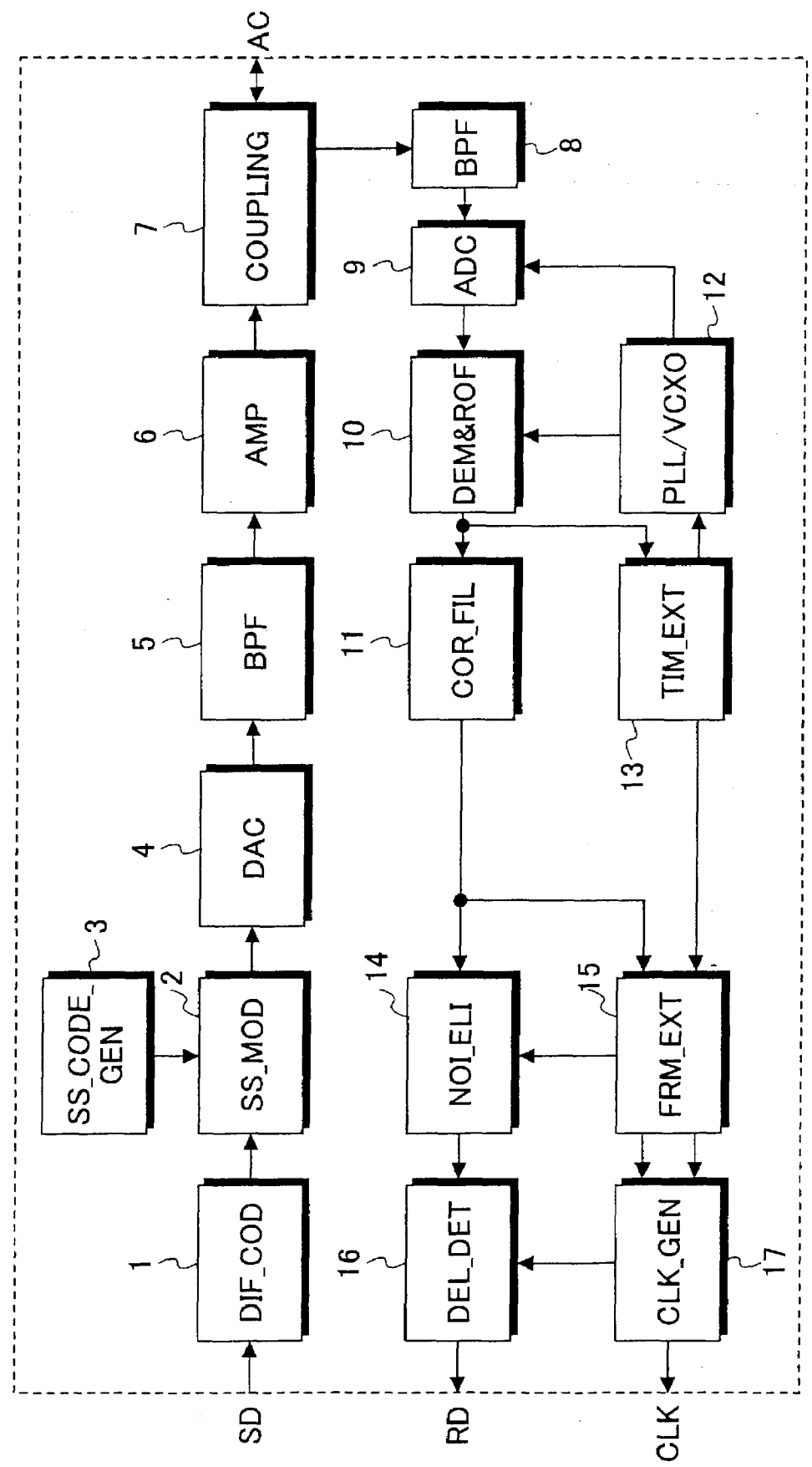
FIG. 1 is a block diagram of a modem of a power-line-carrier communication system in which the noise elimination apparatus in a first preferred embodiment of the present invention is incorporated.

FIG. 1 shows a modem of a power-line-carrier communication system in which the noise elimination apparatus in a first preferred embodiment of the present invention is incorporated.

As shown in FIG. 1, the modem of the present embodiment comprises the differential coding unit (DIF_COD) 1, the SS modulation unit (SS_MOD) 2, the SS code generation unit (SS_CODE_GENE) 3, the DA converter (DAC) 4, the band pass filter (BPF) 5, the amplifier (AMP) 6, the coupling unit (COUPLING) 7, the band pass filter (BPF) 8, the AD converter (ADC) 9, the demodulation and roll-off-filter unit (DEM&ROF) 10, the correlating-filter unit (COR_FIL) 11, the phase sync and voltage controlled oscillator (PLL/VCXO) 12, the timing extraction unit (TIM_EXT) 13, the noise elimination unit (NOI_ELI) 14, the frame extraction unit (FRM_EXT) 15, the delayed-detection unit (DEL_DET) 16, and the clock signal generation unit (CLK_GEN) 17. Moreover, in FIG. 1, RD is the transmit data signal, CLK is the clock signal, RD is the received data signal, and AC is the interior-distribution line.

The differential coding unit 1 performs the differential coding of the transmitting data signal SD. The SS modulation unit 2 carries out the multiplication of the signal from the differential coding unit 1 and the SS code from the SS code generation unit 3, in order to perform the SS modulation. The DA converter 4 converts the SS modulation signal into the analog signal.

The band pass filter 5 removes the undesired frequency component from the analog signal from the DA converter 4. The amplifier 6 amplifies the analog signal from the band pass filter 5 to a predetermined level.

The coupling unit 7 includes a high-frequency transformer or the like, and receives the amplified signal from the amplifier 6, and sends it out to the interior-distribution line AC as the SS modulating signal.

Various kinds of orthogonal-system sequences, such as the M sequence, the gold sequence, the wavelet sequence and the Hadamard sequence can be used as the SS code that is generated by the SS code generation unit 3.

Figure 21:
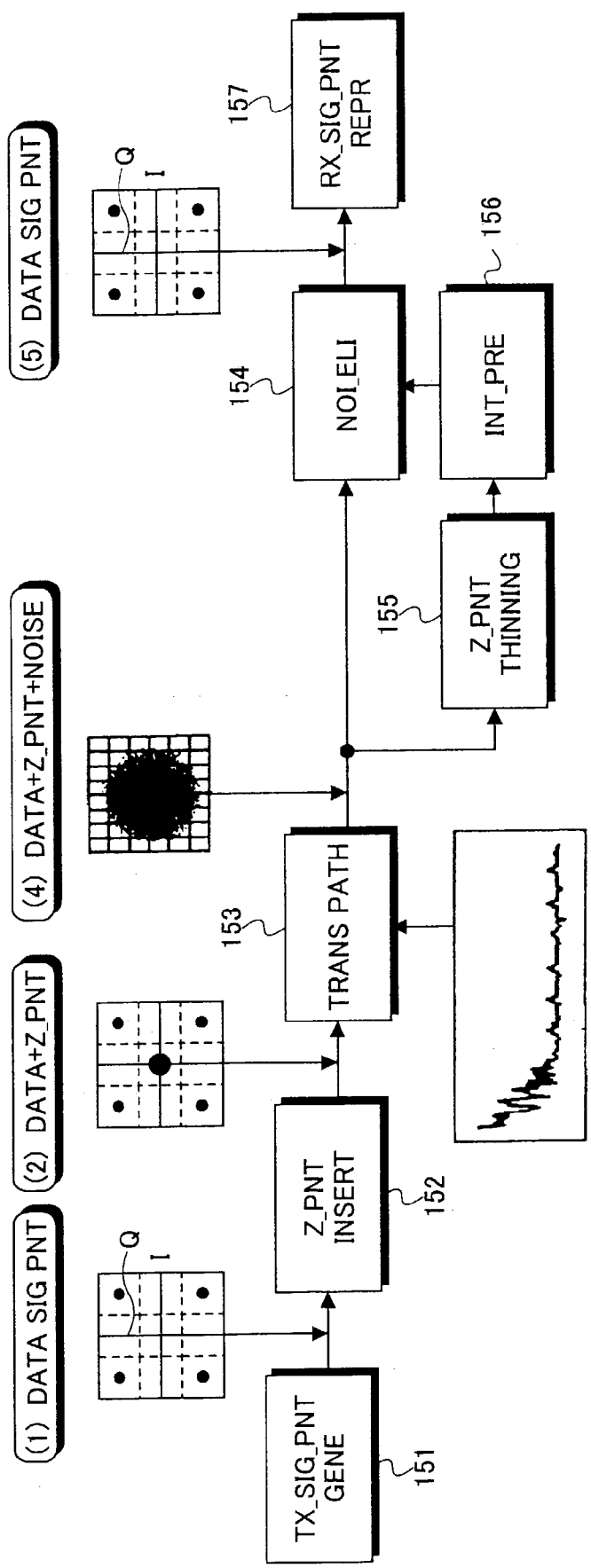
FIG. 21 is a diagram for explaining a conventional noise elimination apparatus.
Figure 23A:
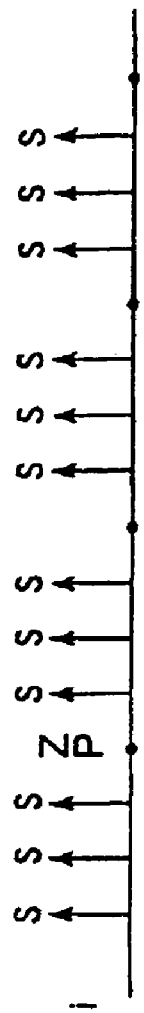
FIG. 23A, FIG. 23B, FIG. 23C, FIG. 23D and FIG. 23E are diagram for explaining various methods of zero-point insertion.
Figure 23B:
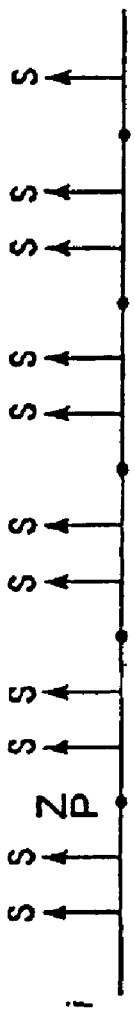
Figure 23C:
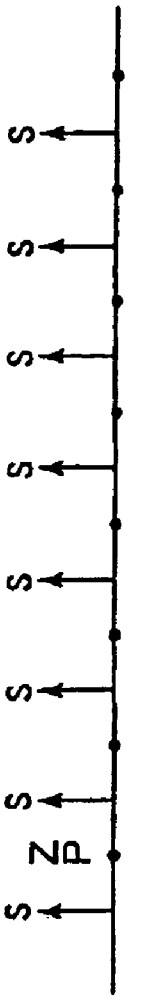
Figure 23D:
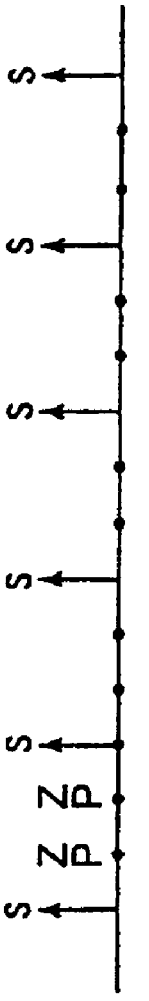
Figure 23E:
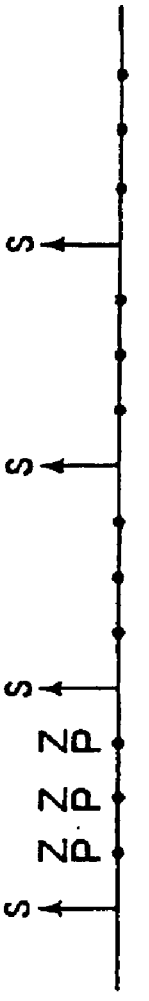
Figure 24A:
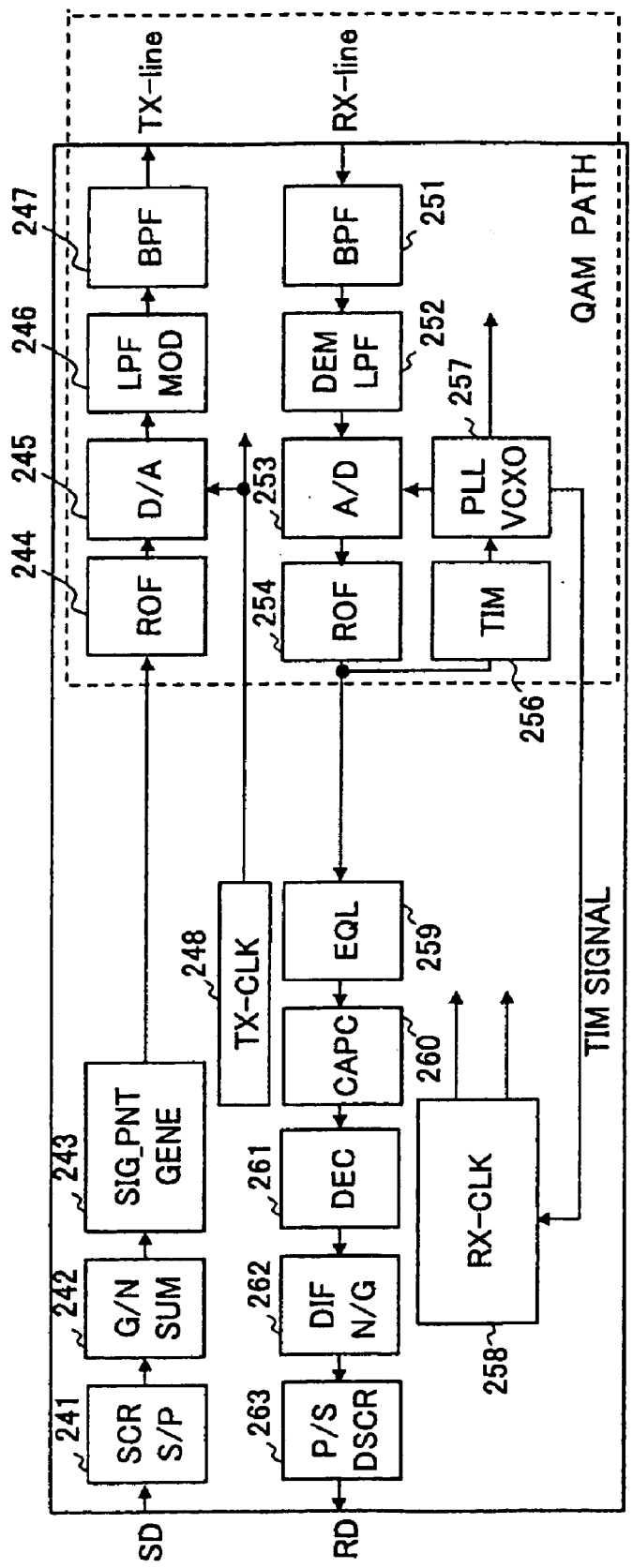
FIG. 24A and FIG. 24B are diagrams showing the configuration and the signal waveform of a modem to which the zero-point insertion is applied.
Figure 24B:
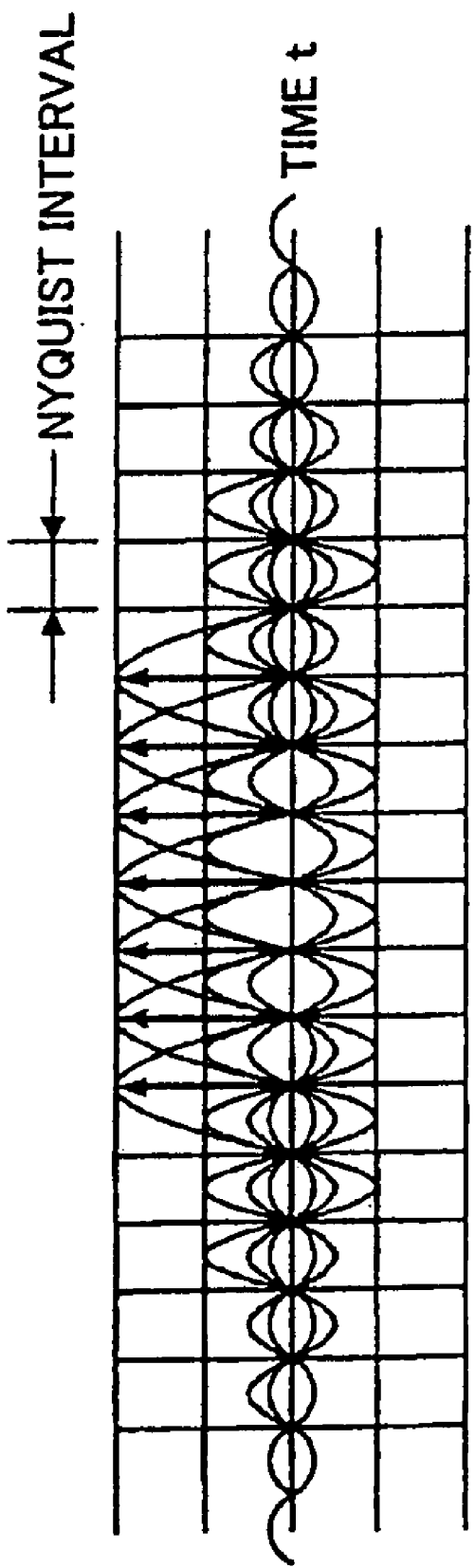

In the transmitter section of the present embodiment, the zero is not inserted to the transmitting data signal like the conventional noise elimination function shown in FIG. 21.

In the receiver section of FIG. 1, the modulation data received through the interior-distribution line AC is inputted into the band pass filter 8 through the coupling unit 7.

The band pass filter 8 removes the undesired frequency component from the received data signal. The AD converter 9 converts the received SS modulation signal into the digital signal.

The demodulation and roll-off-filter unit 10 carries out the demodulation processing of the signal of the transmission-band zone at the base-band signal, and perform the roll-off-filter processing.

The output of the demodulation and roll-off-filter unit 10 is inputted into the correlating-filter unit 11 and the timing extraction unit 13.

The correlating-filter unit 11 is a filter means to perform correlation operation using the same SS code as the SS code of the transmitter section of a modem of the power-line carried communication system.

The correlating-filter unit 11 outputs 1 or −1 at the time of correlation coincidence, and outputs 0 (or 1/n, where n is the number of SS modulation sequence codes) at the time of correlation inequality.

The timing signal which the timing extraction unit 13 has extracted is inputted into the frame extraction unit 15 and the phase sync and voltage controlled oscillator 12.

The output of the voltage controlled oscillator which is obtained by the phase synchronization is sent out to both the demodulation and roll-off-filter unit 10 and the AD converter 9, and this signal is used as the extracted timing signal for the elements 9 and 10.

The frame extraction unit 15 extracts the signal point (center) of the SS modulation based on the output signal of the correlating-filter unit 11 and the timing signal of the TIM extraction unit 13. That is, the output signal of the frame extraction unit 15 becomes 1 at the signal point (center), and becomes the sequences of 0 at other points.

The noise elimination unit 14 carries out the interpolation prediction of the noise component on the signal point, and removes the noise component on the signal point from the waveform on the time axis other than the signal point by the subtraction processing.

The delayed-detection unit 16 performs the delayed detection, compensates for the phase shift, and reproduces the data. The delayed-detection unit 16 outputs the received data signal RD.

The CLK reproduction unit 17 reproduces the clock signal CLK based on the high-speed timing signal which the timing extraction unit 13 has extracted, and the low-speed timing signal which the frame extraction unit 15 has extracted.

That is, the CLK reproduction unit 17 synchronizes the phase of the timing signal which the timing extraction unit 13 has extracted based on the sync signal which indicates the signal point of the SS modulation from the frame extraction unit 15. The CLK reproduction unit 17 outputs the clock signal CLK.

Figure 2A:
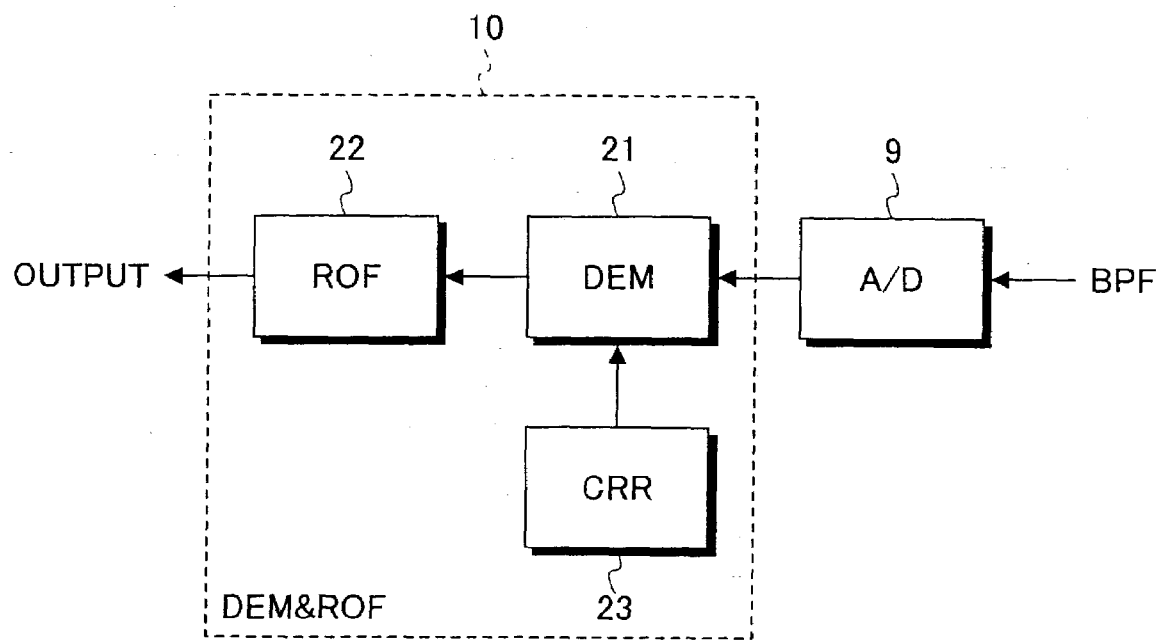
FIG. 2A and FIG. 2B are block diagrams of examples of a demodulation and roll-off filter unit in the modem of FIG. 1.
Figure 2B:
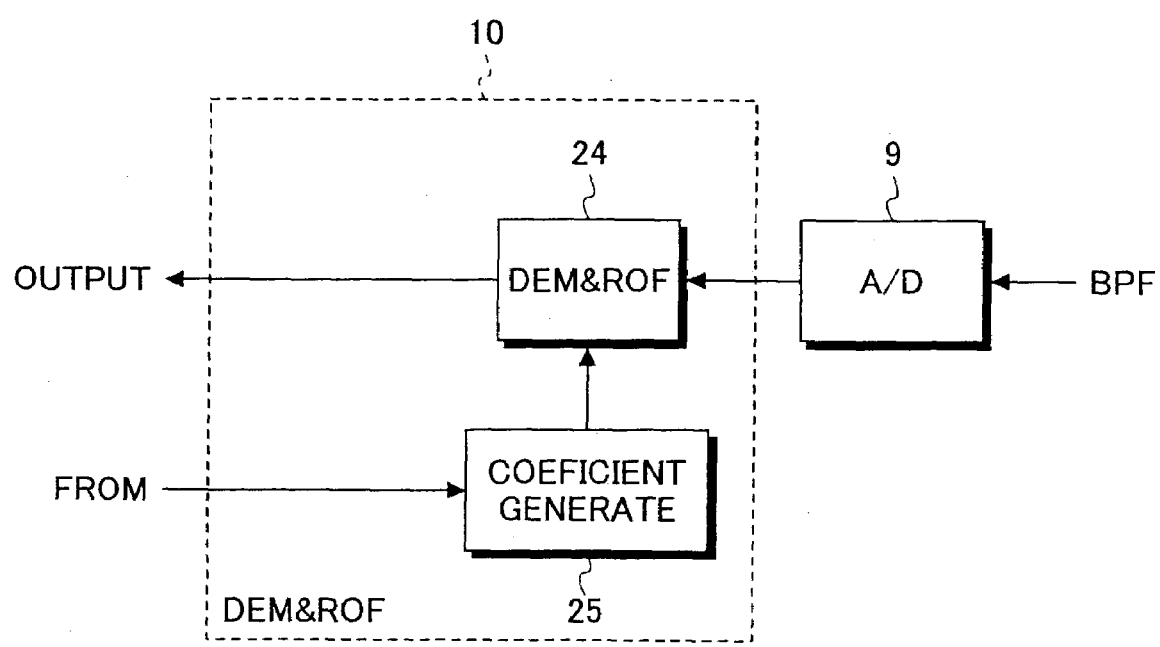

FIG. 2A and FIG. 2B show examples of the demodulation and roll-off filter unit (DEM&ROF) 10 in the modem of FIG. 1.

The AD converter (ADC) 9 in FIG. 1 converts the received SS modulation signal into the digital signal. The digital signal from the ADC 9 is supplied to the demodulation and roll-off-filter unit 10.

FIG. 2A shows the demodulation and roll-off-filter unit 10 which comprises the demodulator (DEM) 21, the roll-off filter (ROF) 22, and the carrier generating circuit (CRR) 23. FIG. 2B shows the demodulation and roll-off-filter unit 10 which comprises the demodulation and roll-off-filter unit (DEM&ROF) 24, and the coefficient generating unit 25.

In the composition of FIG. 2A, when it applies to power-line-carrier communications system, the carrier generating circuit 23 sets the use band to 10–450 kHz, and the main carrier frequency is 230 kHz (=(10+450)/2).

The carrier generating circuit 23 generates the orthogonal carrier signal which is represented by the (cos α) component and the (−sin α) component. The carrier generating circuit 23 supplies the carrier signal to the demodulator 21.

The carrier generating circuit 23 can be constituted in any of various kinds of composition. For example, the composition which reads by the clock signal according to carrier frequency using ROM, and is made into the carrier signal is also possible.

In the composition of FIG. 2A, the demodulator 21 converts the received digital signal from the AD converter 9, into the base-band signal by using the carrier signal from the carrier generating circuit 23. The base-band signal output from the demodulator 21 is the vector signal.

The roll-off filter 22 removes the undesired frequency components other than the 10–450 kHz band. In addition, when the use band is set to 150–350 kHz, the carrier frequency is set to about 250 kHz, and the pass-band of the roll-off filter 22 is set to the frequency range of 150–350 kHz.

In the composition of FIG. 2B, the coefficient generating unit 25 controls the timing phase of the coefficients of the demodulation and roll-off-filter unit 24 according to the timing signal from the timing extraction unit 13 shown in FIG. 1.

The demodulation and roll-off-filter unit 24 outputs the demodulation signal in which the undesired frequency component is removed according to the coefficients from the coefficient generating unit 25.

The above-described composition unifying the demodulator and the roll-off filter is disclosed in, for example, Japanese Published Application No. 1-49225. Moreover, the transmission of a timing signal is disclosed in, for example, Japanese Published Application No. 2-49065. Such technology may be used to realize the noise elimination apparatus of the present embodiment.

Figure 3:
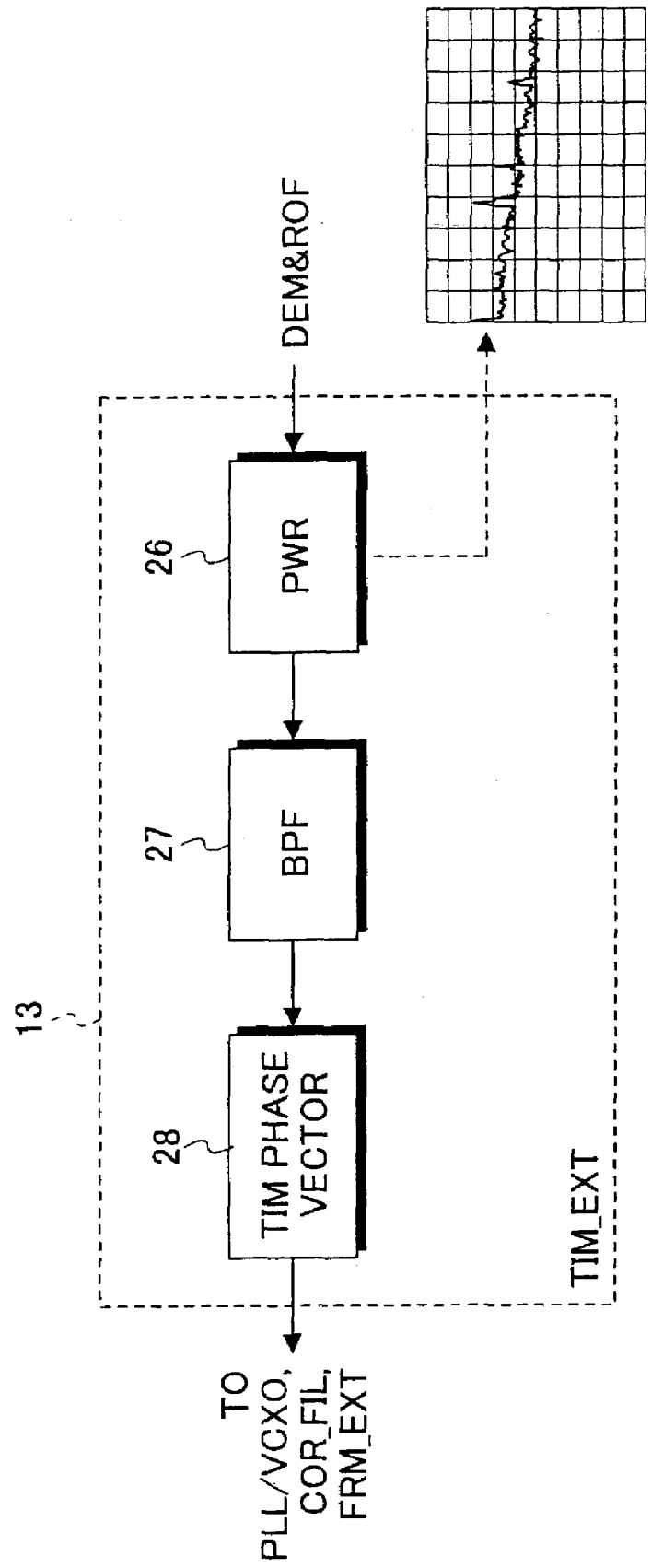
FIG. 3 is a diagram for explaining operation of a TIM extraction unit in the modem of FIG. 1.

FIG. 3 is a diagram for explaining operation of the timing extraction unit 13 in the modem of FIG. 1.

The timing extraction unit 13 comprises the timing phase vector unit (TIM PHASE VECTOR) 28, the power calculation unit (PWR) 26, and the band pass filter (BPF) 27. The timing extraction unit 13 extracts the timing signal of the SS modulation rate. The signal from the demodulation and roll-off-filter unit (DEM&ROF) 10 (FIG. 1) is the vector signal, and the power calculation unit 26 can obtain the spectrum shown by the dotted line arrow of FIG. 3 by calculating the sum of squares of this vector signal. The timing extraction unit 13 generates the timing signal by extracting the line spectrum with the filter.

The band pass filter 27 which receives the output of the power calculation unit 26 is the filter which has the center frequency of the SS modulation rate element, and extracts the above-mentioned line spectrum. The timing phase vector unit 28 outputs the vector timing signal according to the output of the band pass filter 27.

For example, the timing signal which has the 90-degree phase difference of the inputted timing signal and the timing signal delayed by one sample is generated. As for the timing extraction unit 13, for example, Japanese Patent No.

2721454 discloses the timing extraction device, and such known technology may be used.

Figure 4:
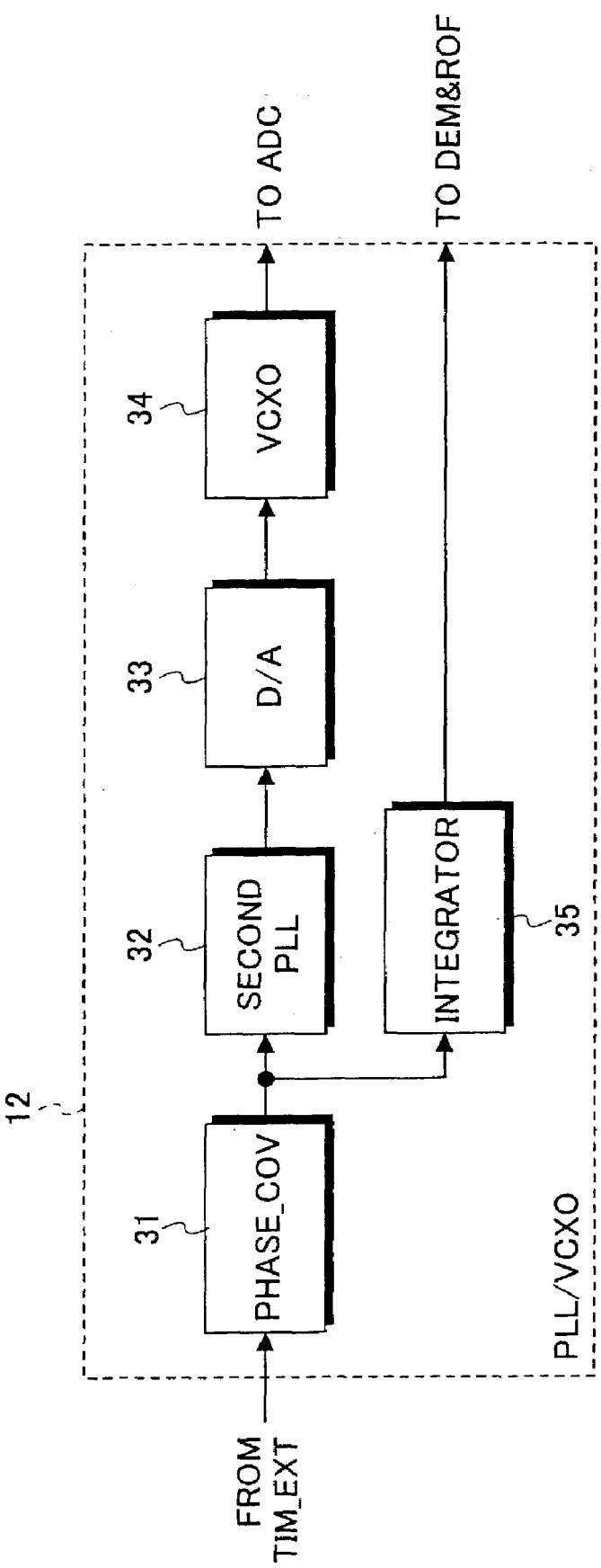
FIG. 4 is a block diagram of a phase synchronization and voltage-controlled oscillator unit in the modem of FIG. 1.

FIG. 4 shows the phase sync and voltage-controlled oscillator unit (PLL/VCXO) 12 in the modem of FIG. 1.

As shown in FIG. 4, the phase sync and voltage controlled oscillator unit 12 comprises the phase angle conversion unit (PHASE_CONV) 31, the secondary phase synchronous circuit (SECOND_PLL) 32, the DA converter (D/A) 33, the voltage control crystal oscillator (VCXO) 34 using the crystal oscillator, and the integrator circuit 35.

The phase angle conversion unit 31 converts the timing vector signal from the timing extraction unit 13 into the scalar signal which becomes settled by the phase angle. This scalar signal is inputted into the secondary PLL 32 and the integrating circuit 35.

The secondary PLL 32 is equivalent to the secondary integrator circuit, and this secondary PLL 32 integrates the scalar signal from the phase angle conversion unit 31, and outputs the phase error signal.

The DA converter 33 coverts the phase error signal from the secondary PLL 32 into the analog signal. The output phase is controlled by adding to the voltage control crystal oscillator 34. The analog signal output from the DA converter 33 is set to the control voltage applied to the oscillator 34.

The output signal of the voltage control crystal oscillator 34 is sent out to the AD converter 9 (FIG. 1) as the sampling timing signal.

Moreover, the integrating circuit 35 integrates the scalar signal from the phase angle conversion unit 31, and outputs the integral signal to the demodulation and roll-off-filter unit 10 (FIG. 1).

As for the phase synchronization and voltage controlled oscillator 12, for example, Japanese Published Patent Application No. 2-49065, Japanese Laid-Open Patent Application No. 62-35717, and Japanese Laid-Open Patent Application No. 62-108643 disclose a similar device. By using such known technology, high-speed transmission of the timing phase signal is possible.

Figure 5:
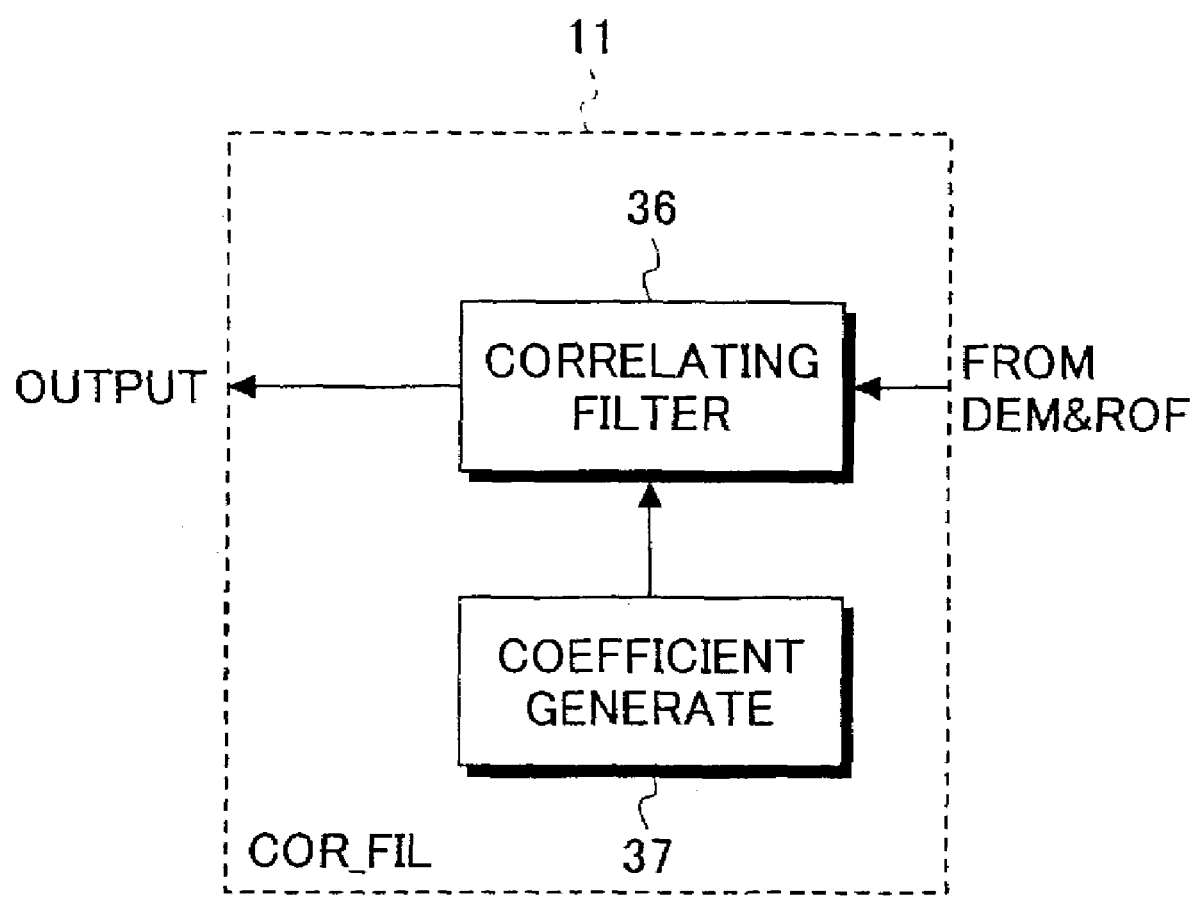
FIG. 5 is a block diagram of a correlating-filter unit in the modem of FIG. 1.

FIG. 5 shows the correlating-filter unit (COR_FIL) 11 in the modem of FIG. 1.

As shown in FIG. 5, the correlating-filter unit 11 comprises the correlating filter 36 and the coefficient generating unit 37. The coefficient generating unit 37 can be considered as the composition which generates the coefficients required for the operation of the correlating filter 36. For example, the coefficient generating unit 37 is constituted by a ROM (read-only memory), which is read out to output the orthogonal-system sequence coefficients of 1 or −1 to the correlating filter 36. The correlating filter 36 generates the correlation output by taking the correlation on the time axis of the demodulated signal to the SS code (the coefficients of the orthogonal-system sequence) from the coefficient generating unit 37. In the correlation output, the signal point (center) on the time axis is set to 1 or −1, and the others are set to 0 (or 1/n, where n is the number of SS modulation sequence codes).

FIG. 6 shows an example of the correlation result of the correlating-filter unit 11 of FIG. 5.

As shown in FIG. 6, the result of the correlation when the signal of 1 or −1 is inputted into the correlating filter 36 is given. In the example of FIG. 6, the orthogonal-system PN (pseudo-noise) sequence pattern "111101011001000" having 15 chips is used. Moreover, in the example of FIG. 6, "1" is used for 1, and "0" is used for −1.

Moreover, in the example of FIG. 6, for each of the 0th through 14th correlations, the accumulation result Σ is shown. Since only the result of the 0th correlation becomes "1"s for all the 15 chips, the accumulation result Σ of the 0th correlation is set to 15. The accumulation results Σ of the other correlations are set to −1.

Figure 7:
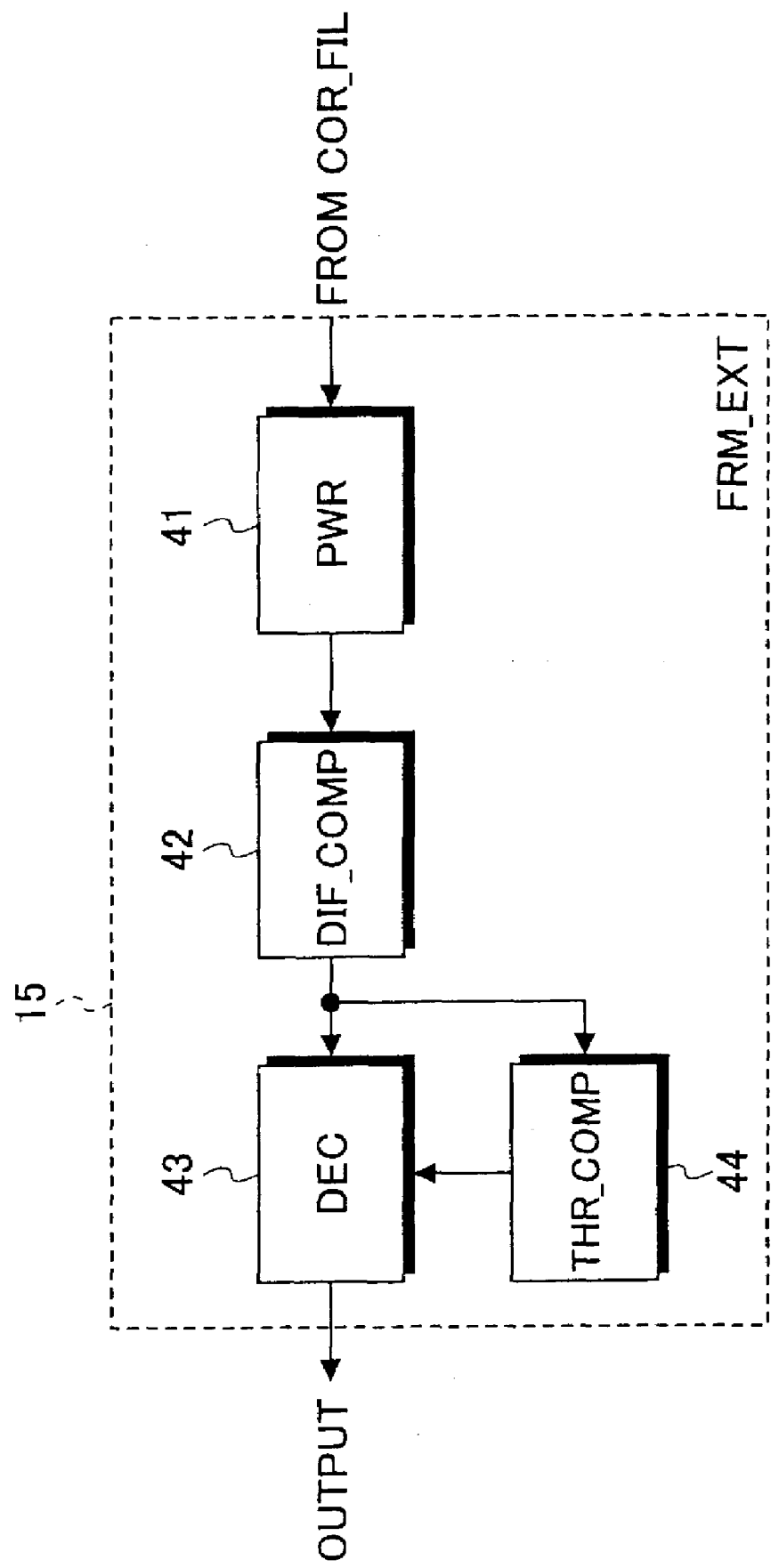
FIG. 7 is a block diagram of a frame extraction unit in the modem of FIG. 1.

FIG. 7 shows the frame extraction unit (FRM_EXT) 15 in the modem of FIG. 1.

As shown in FIG. 7, the frame extraction unit 15 comprises the power calculation unit (PWR) 41 and difference—it consists of the calculation unit (DIF_COMP) 42, the decision unit (DEC) 43, and the threshold calculation unit (THR_COMP) 44.

The output signal of the above-mentioned correlating-filter unit 11 becomes 1 at the signal point (center) where the correlation becomes the maximum, and becomes the signal sequences of 0 at other points. This output signal is equivalent to the vector signal. The power calculation unit 41 computes power by calculating the sum of the squares of such vector signals. The large-amplitude noise in the transmission line is contained in the signal indicating the determined power.

The difference calculation unit 42 computes the difference of the power value on the time-axis. In other words, the value of the difference of the power between the samples on the time-axis is calculated by the calculation unit 42. Thus, the noise component is removed. The difference obtained by the calculation process which is equivalent to the value of the above-mentioned center (the signal point) is outputted as a value of the positive/negative. The threshold calculation unit 44 calculates the value of the difference of the time series signal for the integral value of one frame (in the case of PN pattern of the 15 chips, one frame is equivalent to 15 samples), and the threshold for adding to the decision unit 43 is outputted. The decision unit 43 performs the comparison of the output of the calculation unit 42 with the threshold value from the threshold calculation unit 44, and outputs the signal exceeding the threshold value as a center position signal.

As for the threshold calculation unit 44, it is also possible to calculate the threshold according the time series signal of the value for the average between the frames of the integral value for two or more frames. By such a composition, it is possible to provide the noise elimination apparatus with a high level of noise resistance.

Figure 8:
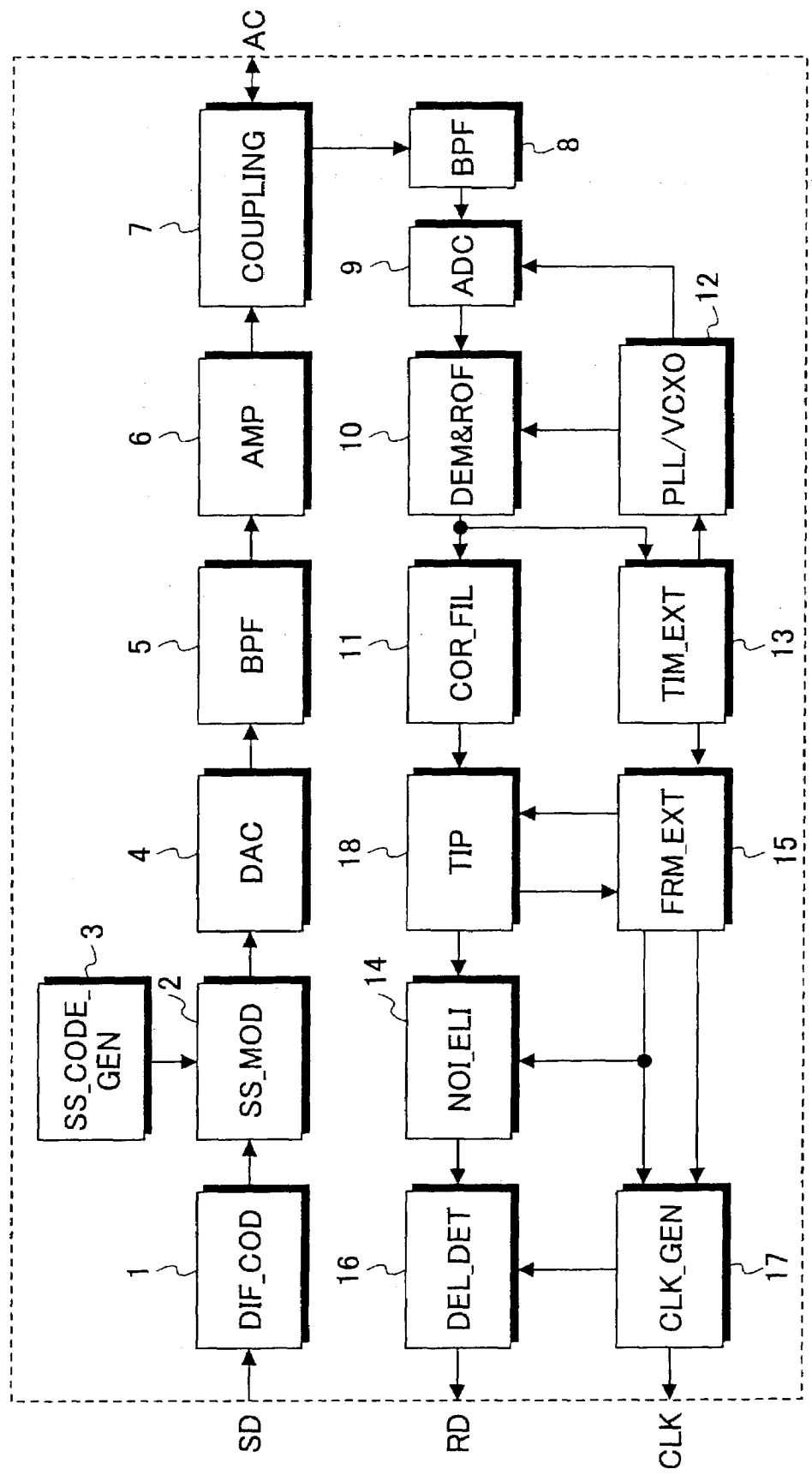
FIG. 8 is a block diagram of a modem of the power-line-carrier communication system in which the noise elimination apparatus in a second preferred embodiment of the present invention is incorporated.

FIG. 8 shows a modem of the power-line-carrier communication system in which the noise elimination apparatus in a second preferred embodiment of the present invention is incorporated.

In FIG. 8, the elements that are essentially the same as corresponding elements in FIG. 1 are designated by the same reference numerals, and a description thereof will be omitted.

In the embodiment of FIG. 8, the composition containing the correlating-filter unit (COR_FIL) 11 and the timing interpolation unit (TIP) 18 are used as a means for performing phase equalization of the correlation output, or a means for obtaining the correlation after the phase equalization.

The timing interpolation unit 18 includes a plurality of timing interpolation filters which divide and process the internal frequencies. The timing interpolation unit 18 inputs the correlation output from the correlating-filter unit 11, transmits the timing signal between the frame extraction units 15, and performs the phase equalization. The correlation output which is obtained by the phase equalization is outputted to the noise elimination unit 14. By this composition, the noise elimination processing in the noise elimination unit 14 becomes easy.

Figure 9:
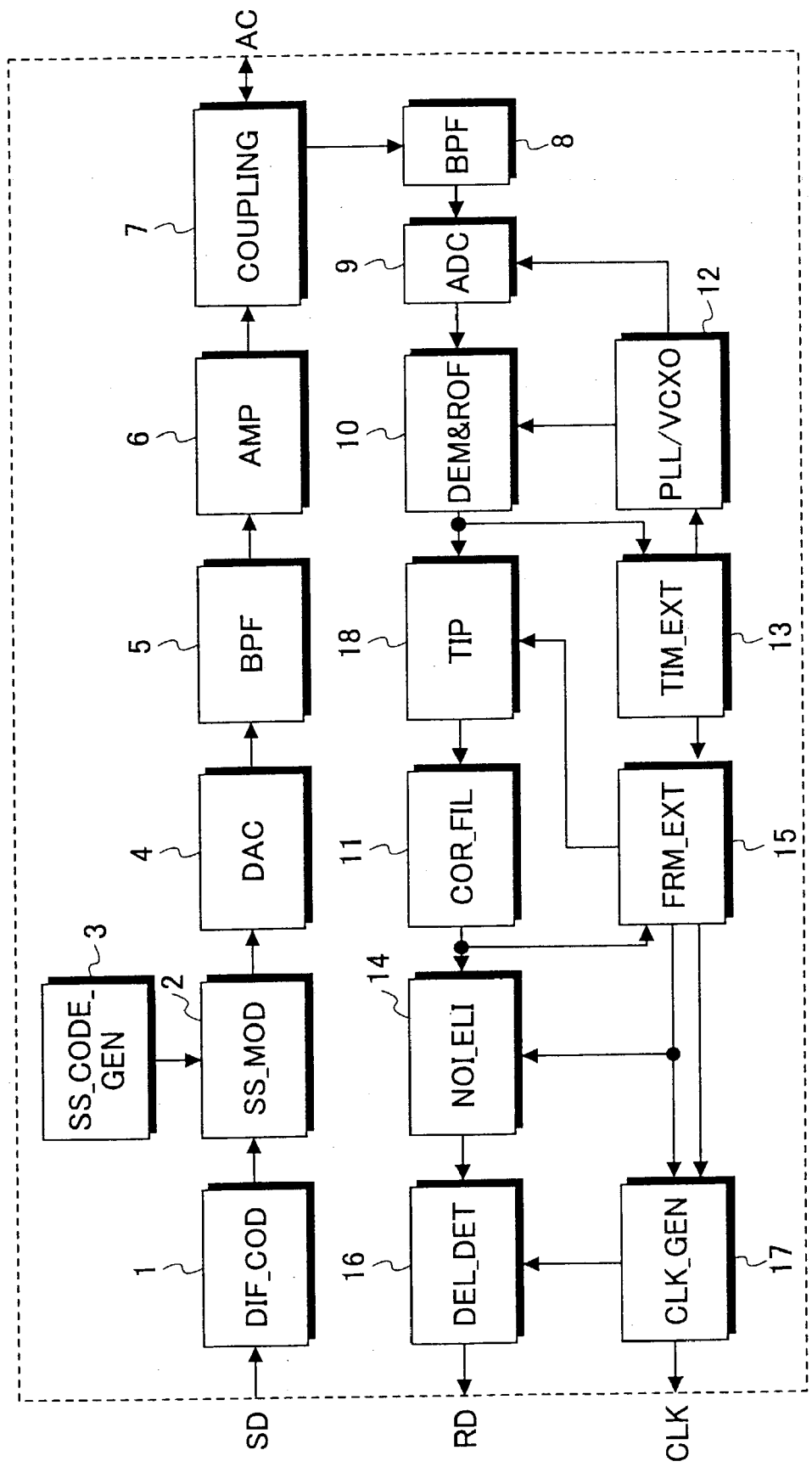
FIG. 9 is a block diagram of a model of the power-line carrier communication system in which the noise elimination apparatus in a third preferred embodiment of the present invention is incorporated.

FIG. 9 shows a model of the power-line carrier communication system in which the noise elimination apparatus in a third preferred embodiment of the present invention is incorporated.

In FIG. 9, the elements that are essentially the same as corresponding elements in FIG. 8 are designated by the same reference numerals, and a description thereof will be omitted.

In the previous embodiment of FIG. 8, it is the composition of inputting into the correlating-filter unit 11 the signal in which the SS modulation is carried out, inputting the correlation output into the timing interpolation unit 18, and performing phase equalization.

In the embodiment of FIG. 9, after inputting and carrying out phase equalization of the signal in which the SS modulation is carried out to the timing interpolation unit 18, it inputs into the correlating-filter unit 11, and the SS code and correlation are searched for and the correlation output is inputted into the noise elimination unit 14.

In the present embodiment, according to the output of the correlating-filter unit 11, and the timing signal from the timing extraction unit 13, the frame extraction unit 15 extracts the signal point (center) of the SS modulation, and sends out the timing signal to the timing interpolation unit 18.

Figure 10:
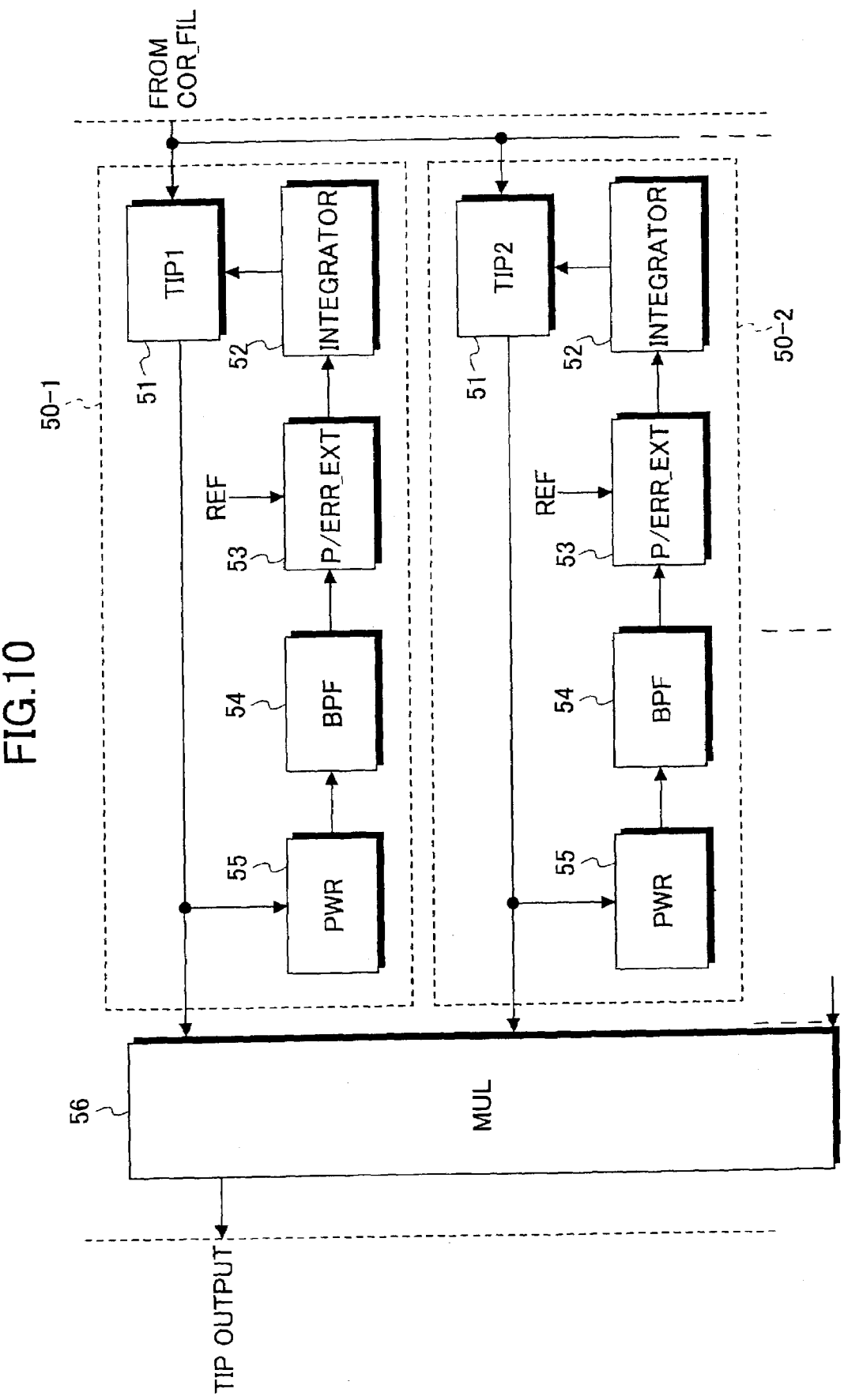
FIG. 10 is a block diagram of a timing interpolation unit in the modem of FIG. 8 or FIG. 9.

FIG. 10 shows the timing interpolation unit 18 in the modem of FIG. 8 or FIG. 9.

As shown in FIG. 10, the timing interpolation unit 18 comprises the plurality of interpolation units 50-1, 50-2, etc., and the multiplexing units 56. Each interpolation unit comprises the timing interpolation filter (TIP1, TIP2, . . . ) 51, the integrating circuit 52, the phase error extraction unit 53, the band pass filter (BPF) 54, and the power calculation unit (PWR) 55. Since the timing interpolation unit 18 is equipped with two or more timing interpolation filters 51 dealing with the interpolation unit, it is enabling each time equalization in the band.

In the composition of FIG. 8, since the signal from the correlating-filter unit 11 is inputted and the signal to which it restored is inputted in the composition of FIG. 9, it is inputted into the interpolation unit 50-1, 50-2, . . . in parallel and the timing interpolation filter 51.

According to the output of this timing interpolation filter 51, the power calculation unit 55 sends out the signal which shows the power value which computed and computed power to the phase error extraction unit 53 through the band pass filter 54.

The band pass filter 54 extracts the 9600 Hz signal in the SS communication made into the transmission rate of 9600 bps.

The phase error extraction unit 53 compares the frame phasing signal from the frame extraction unit 15 with the reference signal REF, and sends out the phase error signal of the comparison result to the integrating circuit 52.

The integrating circuit 52 sends out the control signal to the timing interpolation filter 51, and controls the timing interpolation filter 51 so that it integrates this phase error signal and the phase error serves as zero. Therefore, in the timing interpolation unit 18 including the interpolation units 50-1, 50-2, etc., the phase equalization is performed to correspondence and the signal which is multiplexed by each phase equalization result is outputted by the multiplexing unit 56.

In the composition of FIG. 8, the output of the multiplexing unit 56 is sent out to the noise elimination unit 14. In the composition of FIG. 9, the output of the multiplexing unit 56 is sent out to the correlating-filter unit 11.

Figure 11:
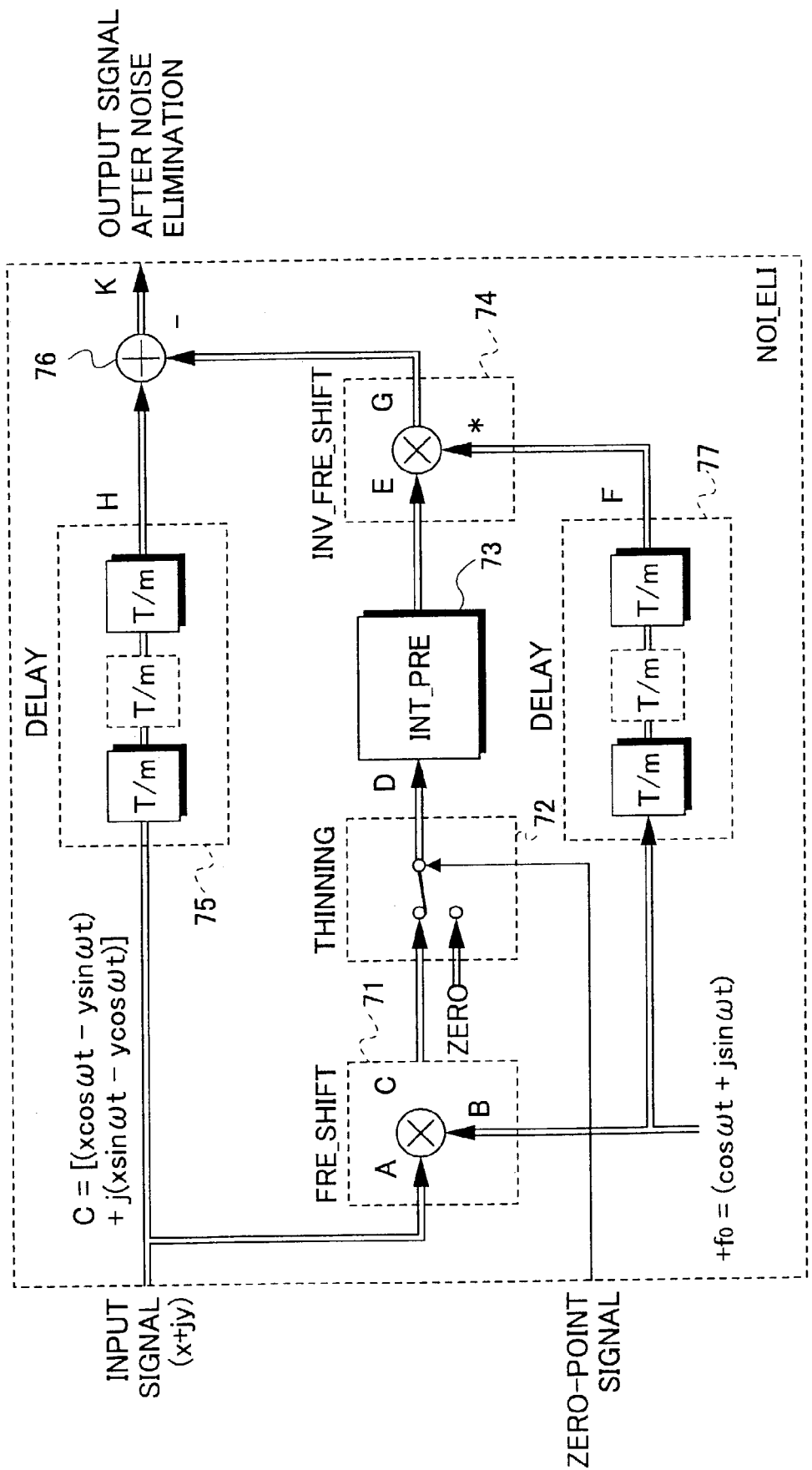
FIG. 11 is a block diagram of a noise elimination unit in the modem of FIG. 1, FIG. 8 or FIG. 9.

FIG. 11 shows the noise elimination unit 14 in the modem of FIG. 1, FIG. 8 or FIG. 9.

As shown in FIG. 11, the noise elimination unit 14 comprises the frequency shift unit 71, the thinning unit 72, the interpolation prediction unit 73, the frequency reverse shift unit 74, the delay circuit 75, the addition unit 76, and the delay circuit 77.

In the delay circuits 75 and 77, "T" indicates the sampling period. The delay circuits 75 and 77 include a plurality of delay elements of T/m (for example, m=4) which are connected in series in order to compensate for the processing delay time, such as the interpolation prediction.

The frequency shift unit 71 carries out the multiplication of the input signal A (=x+jy) and the signal B (=fo=cos ωt+j sin ωt). The multiplication output signal C of the frequency shift unit 71 is represented by the equation C=(x cos ωt−y sin ωt)+j(x sin ωt+y cos ωt).

The thinning unit 72 controls the switching based on the zero-point signal (which is the frame signal from the frame extraction unit 15). The thinning unit 72 performs zero-point insertion to the signal C at the timing of the signal component, and passes the signal C through without performing zero-point insertion at the timing of the noise component.

The signal C is made into the zero point except the signal point where the correlation by the correlating filter becomes the maximum, the zero insertion is performed to the signal point, and the noise component at the zero point is passed through.

The above-described zero point is equivalent to the zero point which is previously described with respect to the transmitting data signal in FIG. 22A. The signal point at which zero is inserted is equivalent to the signal points S1, S2, etc. in FIG. 22A. Since the timing of the signal C except the signal point where the correlation value becomes the maximum is the timing of the noise component, the thinning unit 72 outputs to the interpolation prediction unit 73 the signal D containing the signal point at which zero is inserted, and the zero point at which the noise component is overlapped.

The interpolation prediction unit 73 predicts the noise component at the signal point (where zero is inserted) through the interpolation prediction processing based on the signal D indicating the noise component. The interpolation prediction unit 73 outputs the signal E to the frequency reverse shift unit 74.

The frequency reverse shift unit 74 performs the multiplication of the signal F from the delay circuit 77 ("*" in FIG. 11 indicates the complex conjugate signal) and the signal E from the interpolation prediction unit 73. In this case, the multiplication of the signal B and the received input signal A is performed by the frequency shift unit 71 in order to perform the frequency forward shifting, and the frequency reverse shift unit 74 performs the frequency reverse shifting by performing the multiplication of the complex conjugate signal F of the signal B and the output signal E of the interpolation prediction unit 73.

The addition unit 76 serves to subtract, from the signal H which is the delayed input signal A output by the delay circuit 75, the signal G which indicates the noise component predicted by the interpolation prediction and obtained by the frequency reverse shifting. Therefore, the addition unit 76 outputs the signal K after the noise elimination.

Figure 12:
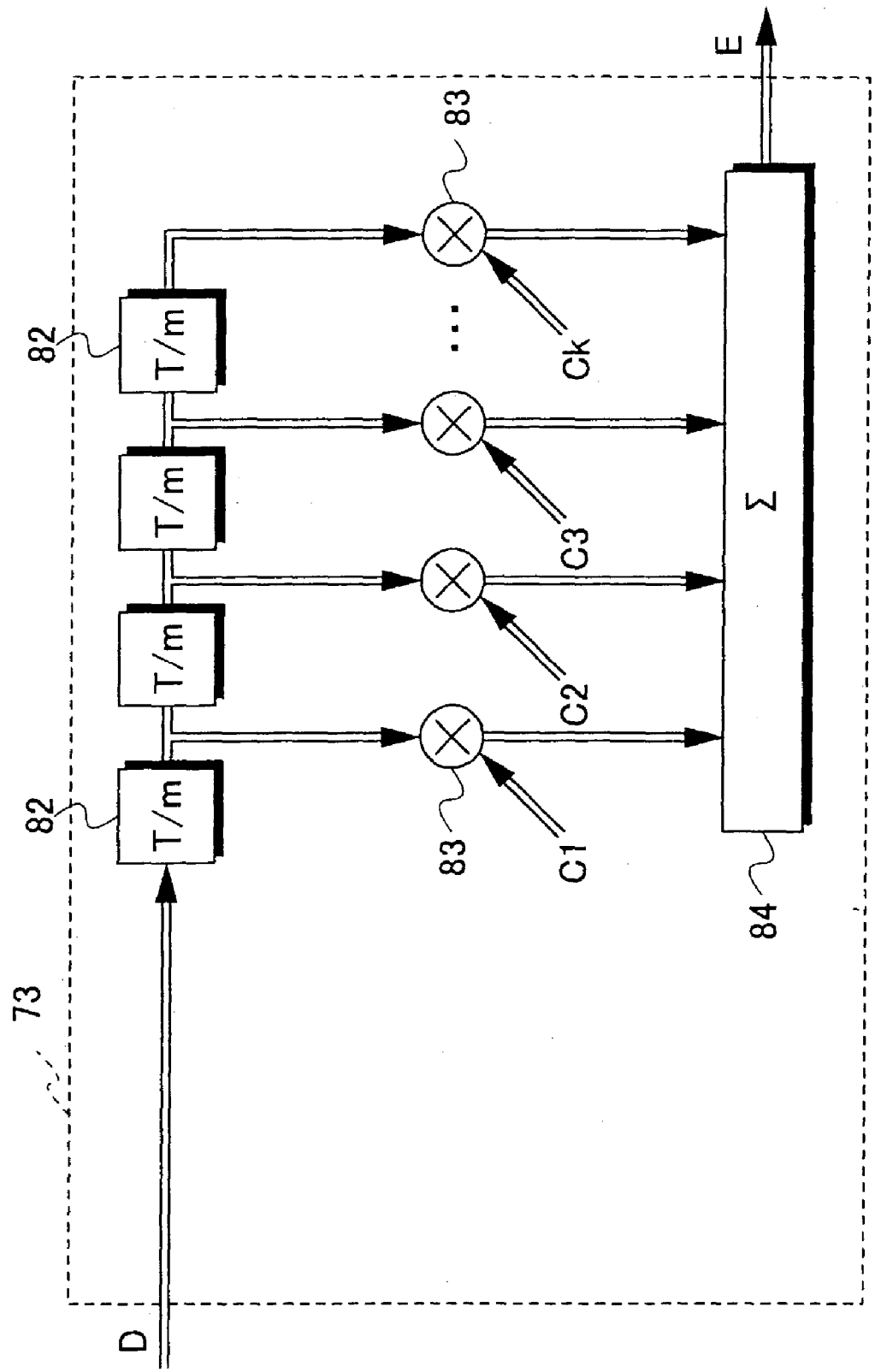
FIG. 12 is a block diagram of an interpolation predicting unit in the noise elimination unit of FIG. 11.

FIG. 12 shows the interpolation predicting unit 73 in the noise elimination unit of FIG. 11. The interpolation prediction unit 73 in FIG. 12 is equivalent to the composition of the correlating-filter unit 11 in FIG. 1, FIG. 8, and FIG. 9.

The interpolation prediction unit 73 of FIG. 12 comprises the delay elements (T/m) 82, the multipliers 83, and the adder (Σ) 84. C1, C2, C3, . . . Ck are the filter coefficients in the case where the interpolation prediction unit 73 is constituted. On the other hand, C1, C2, C3, . . . Ck are the SS codes in the case where the correlating-filter unit 11 is constituted.

The interpolation prediction unit 73 of FIG. 12 is arranged in a formation of a transversal-type filter. The output signals D of the thinning unit 72 (FIG. 11) are received at the input of the unit 73, and the signal E indicating the noise component is outputted by interpolation prediction processing. The interpolation prediction filter is composed of the delay elements 82, the multipliers 83 and the adder 84, and the interpolation prediction processing is carried out by using the output signals D (which indicate the noise component overlapped at the zero point) which are received before and after the zero insertion timing (the signal point).

Figure 13:
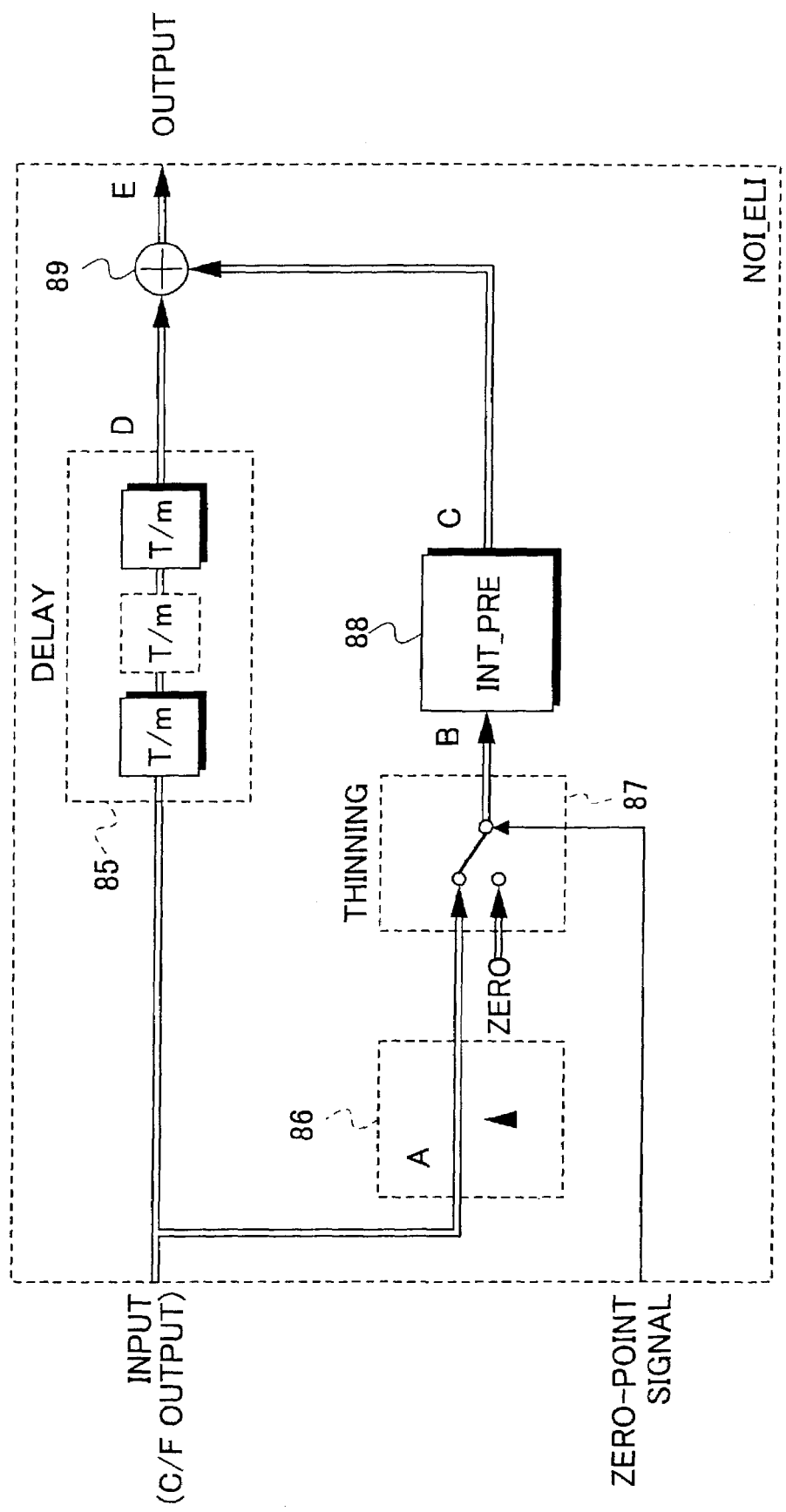
FIG. 13 is a block diagram of a variation of the noise elimination unit of FIG. 11.

FIG. 13 shows a variation of the noise elimination unit 14 of FIG. 11.

As shown in FIG. 13, the noise elimination unit 14 in this embodiment is arranged in a formation of a band pass filter. The noise elimination unit 14 comprises the delay circuit 85, the pass-through circuit 86 provided at the position equivalent to the frequency shifting unit 71 of FIG. 11, the thinning unit 87, the interpolation prediction unit 88, and the adder 89.

The output signals A of the correlating-filter unit 11 are received at the delay circuit 85 and the thinning unit 87. The thinning unit 87 is the same as the thinning unit 72 in FIG. 11. In the thinning unit 87, the zero-point insertion is performed at the timing of the signal component (indicated by the zero-point signal from the frame extraction unit), and the signals A are passed through to the interpolation prediction unit 88 at the timing of the noise component.

The signal B from the thinning unit 87 (which is equivalent to the signal D in FIG. 11) is sent out to the interpolation prediction unit 88.

The interpolation prediction unit 88 is arranged in a formation of a band pass filter which extracts only the frequency component at which the noise elimination is performed.

The output signal C of the interpolation prediction unit 88 (which is equivalent to the signal G in FIG. 11) is sent out to the adder 89. The adder 89 serves to subtract the signal C from the interpolation prediction unit 88 from the signal D from the delay circuit 85 (which is equivalent to the signal H in FIG. 11).

Therefore, the adder 89 can output to the delayed-detection unit 16 the signal E (which is equivalent to the signal K in FIG. 11) in which the noise component of the desired frequency component is from the signal D containing the noise component.

The interpolation prediction unit 88 of FIG. 13 is arranged in a formation of a transversal type filter that is the same as that shown in FIG. 11.

FIG. 14 is a diagram for explaining operation of the noise elimination unit of the present invention.

In the present embodiment, the frequency shifting and thinning unit (FRE_SHIFT & THIN) 91, the interpolation and shifting unit (INT_SHIFT) 92, and the subtraction unit (SUBTRACT) 93 are equivalent to the composition of the noise elimination unit 14 of FIG. 1 or FIG. 8, or the noise elimination unit of FIG. 11.

The correlating-filter unit (COR_FIL) 90 is equivalent to the correlating-filter unit 11 of FIG. 1 or FIG. 8. The received signal point reproduction unit (RSP_REP) 94 is equivalent to the delayed-detection unit 16 of FIG. 1 or FIG. 8.

The frequency shifting/thinning unit 91 has both the function of the frequency shift unit 71 and the function of the thinning unit 72 of FIG. 11. The interpolation and shift unit 92 has both the function of the interpolation prediction unit 73 and the function of the frequency reverse shift unit 74 of FIG. 11. The subtraction unit 93 has the function of the addition unit 76 of FIG. 11.

As in FIG. 14, the states of the spectrum at the respective locations (1)–(6) of the noise elimination unit are illustrated. Namely, (1) noise distribution, (2) +96 kHz shift, (3) thinning, (4) interpolation, (5) –96 kHz shift, and (6) noise elimination are shown.

The signal that is inputted from the correlating-filter unit 90 to the noise elimination unit has the respective bands of –192 kHz to +192 kHz including the fold-back component.

As mentioned above, in the power-line-carrier communication system, the noise level in the low-frequency range is higher than in the high-frequency range, and it becomes the spectrum shown as in (1) noise distribution.

Supposing that in the noise distribution A indicates the frequency region of –192 kHz to –96 kHz, B indicates the frequency region of –96 kHz to 0 kHz, C indicates the frequency region of 0 kHz to +96 kHz, and D indicates the frequency region of +96 kHz to +192 kHz, the noise levels of these frequency regions will have the relation of A>B>C>D.

In the frequency shifting/thinning unit 91, for each of the frequency regions A, B, C and D, the signal frequency is shifted by 96 kHz, and the signal portion of the region D is transferred or folded back to the region of –192 kHz to –96 kHz by the frequency shifting, as in (2) +96 kHz shift.

By the thinning processing, the zero insertion is performed to the signal point where the correlation by the correlating-filter unit 90 becomes the maximum, and since it is only the noise component other than this (equivalent to the zero point). As in (3) thinning, the signal portion of each frequency region is shifted by the thinning processing.

By the interpolation processing of the interpolation and shifting unit 92, the signal in the frequency range of –96 kHz to +96 kHz is extracted, as in (4) interpolation.

By the frequency reverse shifting (–96 kHz) of the interpolation and shifting unit 92, the signal portion of each frequency region is shifted to the frequency regions of –196 kHz to 0 kHz, as in (5) –96 kHz shift.

The subtraction unit 93 subtracts the signal indicated by (5) –96 kHz shift from the signal indicated by (1) noise distribution. Therefore, as shown in (6) noise elimination, only the signal portion in the frequency regions C and D remain. That is, the noise component with the large amplitude on the low-frequency side is removed.

The signal after the noise elimination is sent out to the received signal point reproduction unit 94, and it is possible to produce the reconstructed data without error.

The conventional noise elimination function of FIG. 21 inserts the zero point to the transmitting data signal. However, the noise elimination unit of the present invention does not insert the zero point to the transmitting data signal. Even if the zero point insertion is not performed to the transmitting data signal, it can safely remove the noise from the received data signal in which the large-amplitude noise is included by performing the operation similar to the zero-point insertion.

Figure 15A:
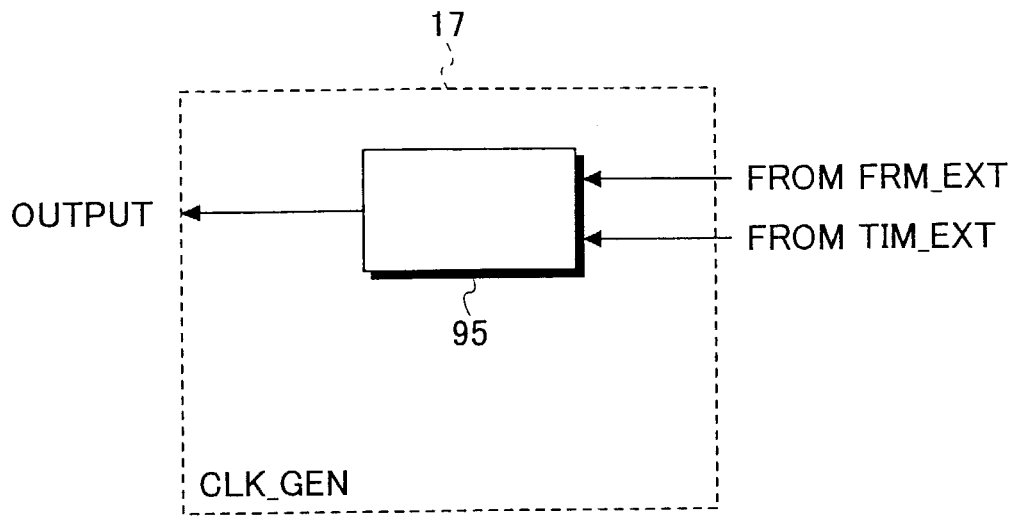
FIG. 15A and FIG. 15B are block diagrams of a clock reproduction unit and a delayed detection unit.
Figure 15B:
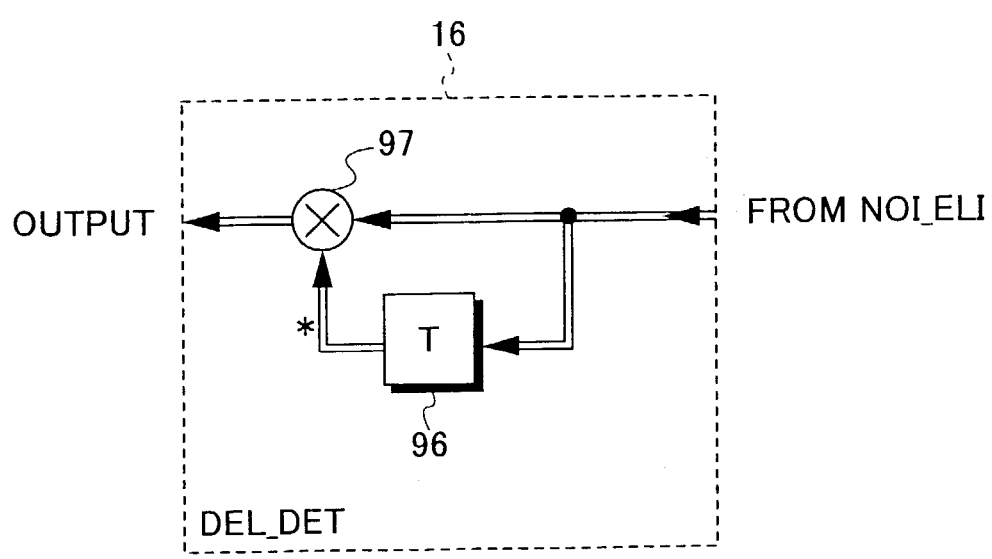

FIG. 15A and FIG. 15B show the clock reproduction unit 17 and the delayed detection unit 16 respectively.

The CLK reproduction unit 17 of FIG. 15A comprises the frequency divider 95 which performs the dividing processing based on the high-speed timing signal from the timing extraction unit (TIM_EXT) 13 and the low-speed sync signal from the frame extraction unit (FRM_EXT) 15.

The delayed-detection unit 16 of FIG. 15B comprises the delay circuit 96 which gives the delay time for one frame, and the multiplier 97. "*" in FIG. 15B indicates the complex conjugate signal. For example, when applying to the 9600 bps modem, the delay time of the delay circuit 96 can be set to 1/9600 (s).

The delayed-detection unit 16 receives the noise-eliminated signal from the noise elimination unit 14, and performs the delayed detection. The indefinite phase component is canceled by the delayed detection, and the reproduction of the received data without error is possible.

FIG. 16A, FIG. 16B, FIG. 16C and FIG. 16D are diagrams for explaining the thinning processing.

In FIG. 16A–FIG. 16D, the diagram on the left-hand side shows the sampled data indicating the amplitude of the signal on the time axis, and the diagram on the right-hand side shows the spectrum of the signal.

Figure 16A:
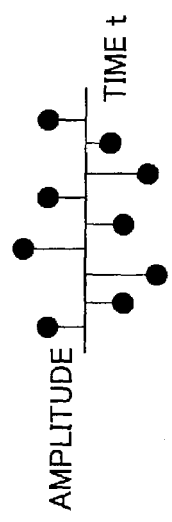
FIG. 16A, FIG. 16B, FIG. 16C and FIG. 16D are diagrams for explaining thinning processing.

FIG. 16A shows the sampled data and spectrum of the signal S(n). The z-transform A of the signal S(n) is determined by the equation $A=S(z)=\Sigma S(n)z^{-n}$. The spectrum is set to the frequency band of 0–fs/2 where "fs" indicates the sampling frequency.

Figure 16B:
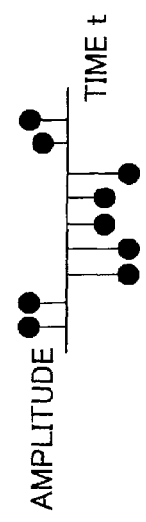

FIG. 16B shows the sampled data and spectrum of the signal $[(-1)^n *S(n)]$. The z-transform B of the reversed signal of the signal S(n) is determined by the equation $B=Z[(-1)^n S(n)]=S(-z)$. In this case, the signal is reversed only to the signal component at the signal point, and the spectrum becomes the reversal of the spectrum of FIG. 16A.

Figure 16C:
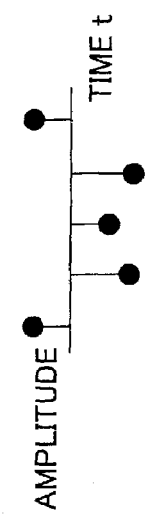

If the reversed signal and the signal before the reversal are added together, it will become the sampled data and spectrum of the signal t(n) which is shown in FIG. 16C.

The z-transform C of the signal after the addition is determined by the equation $C=Z[t(n)]=T(z)=(\frac{1}{2})*[S(z)+S(-z)]$. Since $t(1), t(3), t(5), \ldots =0$, the z-transform C is expressed as $T(z)=\Sigma t(2n)*Z^{-2n}$.

The signal D in which the signal point of t(n)=0 is thinned out is represented by the equation $D=u(n)=T(z^{1/2})$.

The final signal E can be expressed as $E=u(z)=[S(z^{1/2})+S(-z^{1/2})]/2$. That is, FIG. 16D shows the sampled data and spectrum of the signal u(n), and the frequency band is set to half of the frequency band of the spectrum shown in FIG. 16A.

FIG. 17A and FIG. 17B are diagrams for explaining the interpolation processing.

Figure 16D:
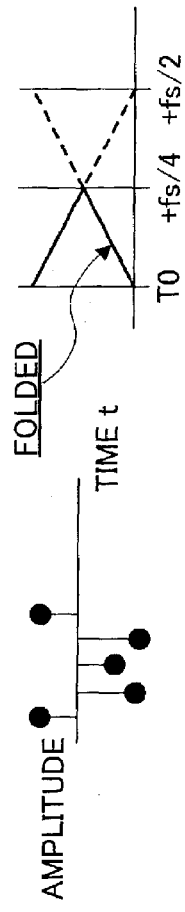
Figure 18:
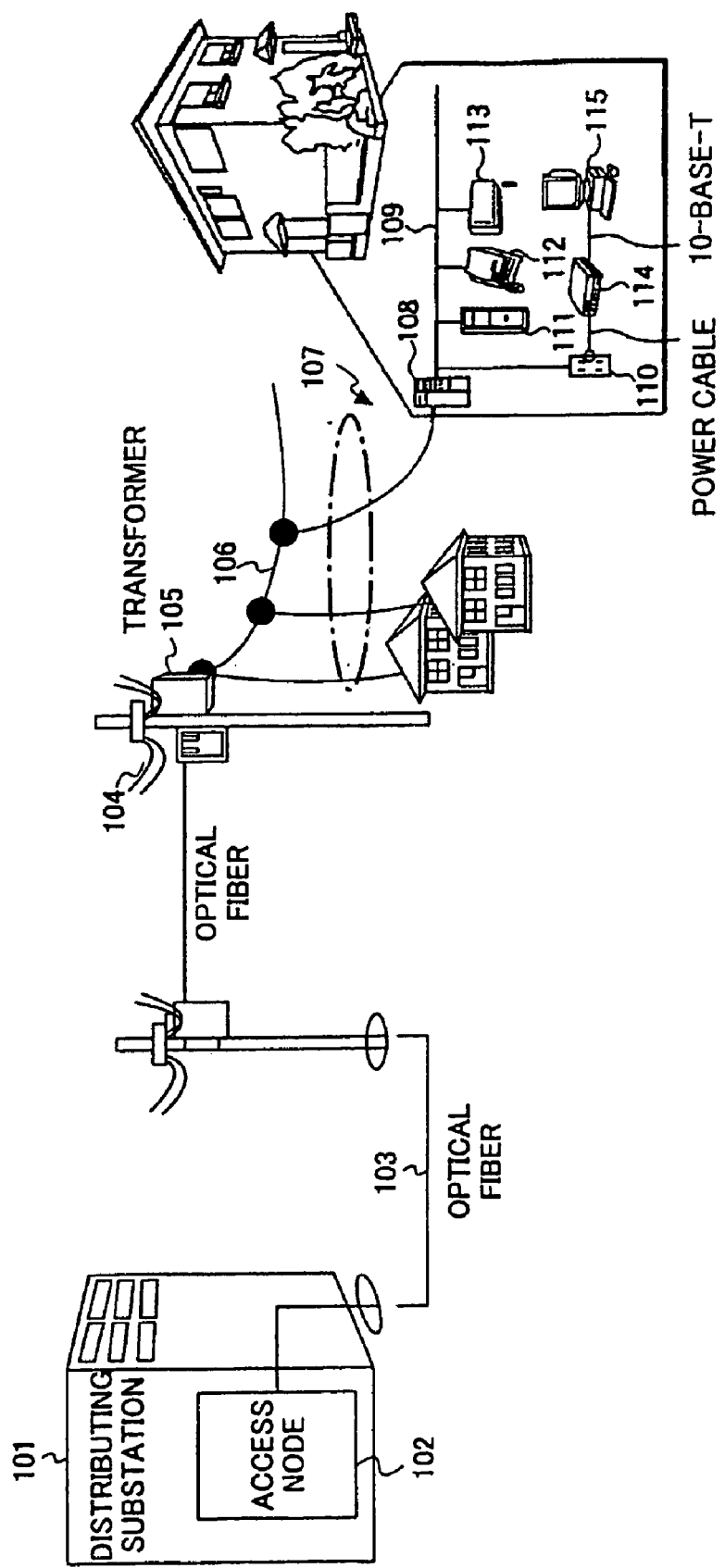
FIG. 18 is a diagram of a power-line-carrier communication system.
Figure 19A:
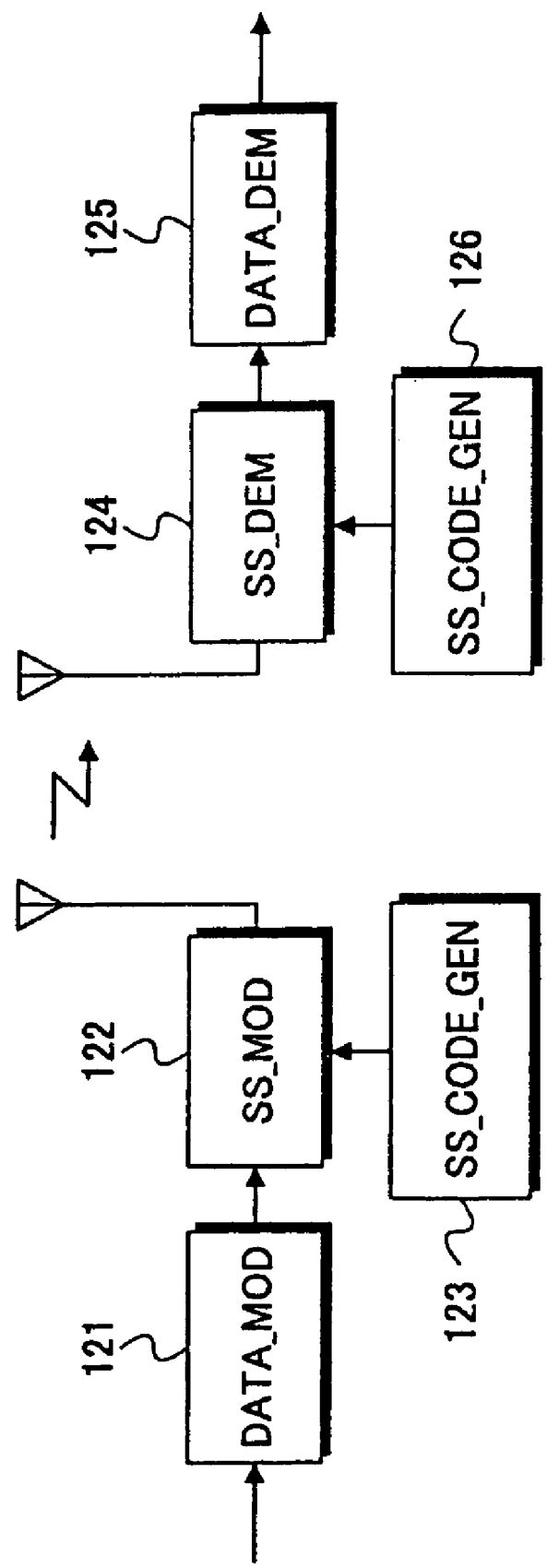
FIG. 19A, FIG. 19B, FIG. 19C and FIG. 19D are diagrams for explaining the concept of a spread spectrum communication.
Figure 19B:
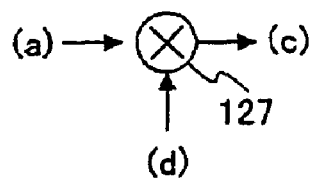
Figure 19C:
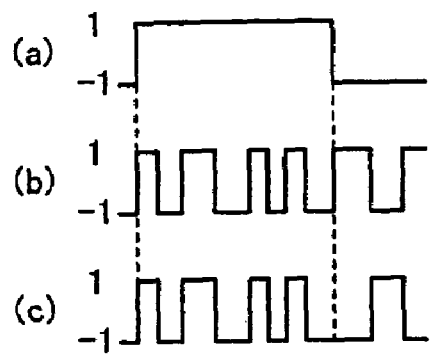
Figure 19D:
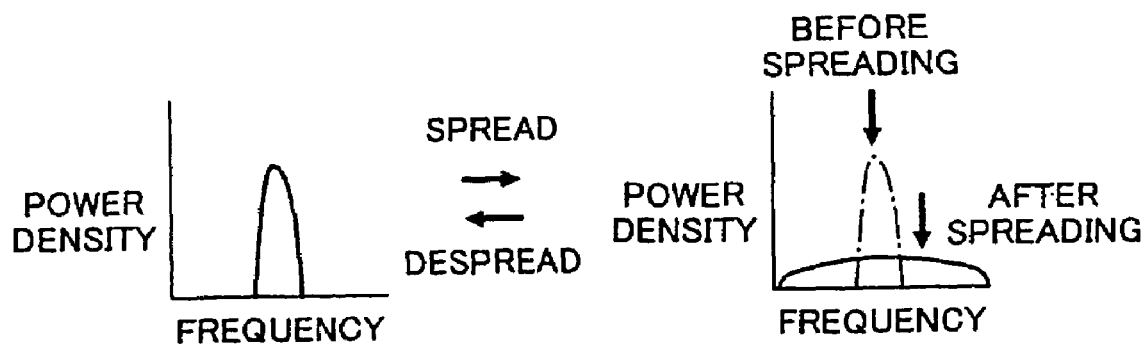
Figure 20:
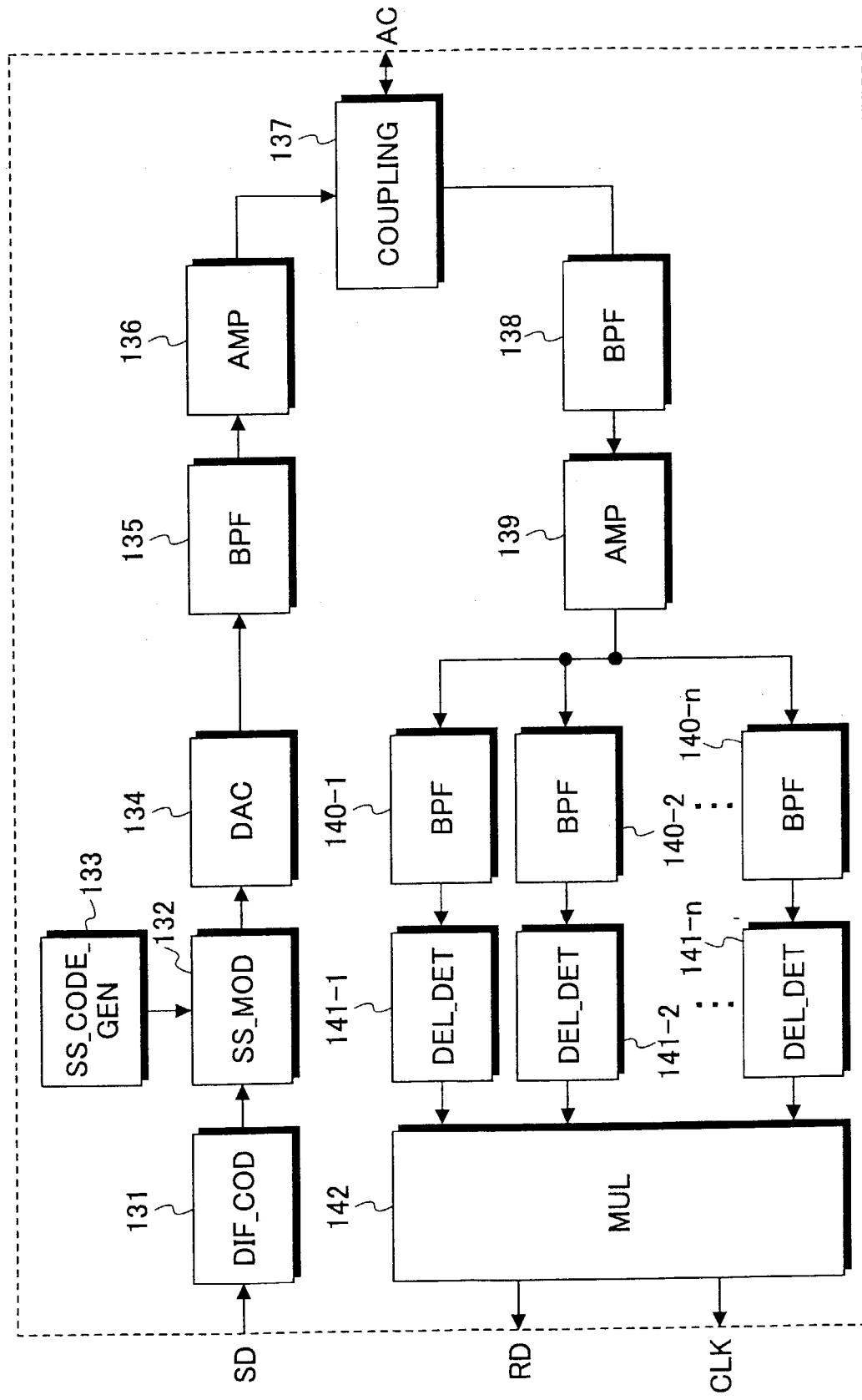
FIG. 20 is a block diagram of a conventional modem.

The sampled data and spectrum of the signal u(n) shown in FIG. 17A correspond to the sampled data and spectrum of the signal u(n) shown in FIG. 16D. The signal u(n) is obtained by thinning processing and has only the noise component. If zero is inserted, it will become the sampled data and spectrum of the signal t(n) shown in FIG. 17B.

The z-transform F of this interpolation signal t(n) is represented by the equation $F=T(z)=\Sigma t(n)z^{-n}$.

Since $t(1), t(3), t(5), \ldots =0$, the z-transform F can be expressed as $F=\Sigma t(2n)z^{-n}=u(n)z^{-2n}$. Therefore, it is set to $T(z)=U(z^2)$, and the spectrum will have the frequency band of 0–fs/2 by the folding back of the frequency band of 0–fs/4.

The signal T(z) has the same speed as that of the received signal S(n), and it contains only the noise component. Hence, the noise component can be eliminated by carrying out the subtraction processing by the adder 76 (FIG. 11) and the frequency shifting of the received signal by the frequency reverse shift unit 74 (FIG. 11).

The present invention is not limited to the above-described embodiments, and variations and modifications may be made without departing from the scope of the present invention. For example, the present invention is applicable to not only the modem of the power-line-carrier communication system but also the modem of another communication system. Moreover, it is also possible to realize the functions of the respective elements by using the computation function of a DSP (digital signal processor).

Further, the present invention is based on Japanese priority application No. 2002-131123, filed on May 7, 2002, the entire contents of which are hereby incorporated by reference.

What is claimed is:

1. A noise elimination method, comprising the steps of:

receiving a transmitted spread spectrum modulation signal, the modulation signal having a data signal and an overlapping noise component at a signal point on a time axis and having a noise component at a zero point on the time axis;

generating a correlation of the received modulation signal to a spread spectrum code by using a correlating filter;

setting zero at points of the received modulation signal other than the signal point where the correlation becomes the maximum, so that the noise component at the zero point is extracted from the received modulation signal;

predicting the noise component at the signal point by performing interpolation prediction based on the extracted noise component; and removing the noise component at the signal point from the received modulation signal based on the predicted noise component.

2. A noise elimination method, comprising the steps of:

receiving a transmitted spread spectrum modulation signal, the modulation signal having a data signal and an overlapping noise component at a signal point on a time axis and having a noise component at a zero point on the time axis;

generating a correlation of the received modulation signal to a spread spectrum code by using a correlating filter;

performing phase equalization of an output of the correlating filter by using a timing interpolation unit including a plurality of timing interpolation filters;

setting zero at points of the received modulation signal other than the signal point where the correlation becomes the maximum, so that the noise component at the zero point is extracted from the received modulation signal;

predicting the noise component at the signal point by performing interpolation prediction based on the extracted noise component; and removing the noise component at the signal point from the received modulation signal based on the predicted noise component.

3. A noise elimination apparatus which receives a transmitted spread spectrum modulation signal, the modulation signal having a data signal and an overlapping noise component at a signal point on a time axis and having a noise component at a zero point on the time axis, the noise elimination apparatus comprising:

a correlating filter unit generating a correlation of the received modulation signal to a spread spectrum code by using a correlating filter; and a noise elimination unit setting zero at points of the received modulation signal other than the signal point where the correlation becomes the maximum, so that the noise component at the zero point is extracted from the received modulation signal, wherein the noise elimination unit predicts the noise component at the signal point by performing interpolation prediction based on the extracted noise component, and the noise elimination unit removing the noise component at the signal point from the received modulation signal based on the predicted noise component.

4. A noise elimination apparatus which receives a transmitted spread spectrum modulation signal, the modulation signal having a data signal and an overlapping noise component at a signal point on a time axis and having a noise component at a zero point on the time axis, the noise elimination apparatus comprising:

a correlating filter unit generating a correlation of the received modulation signal to a spread spectrum code by using a correlating filter;

a timing interpolation unit performing phase equalization of an output of the correlating filter by using a plurality of timing interpolation filters; and a noise elimination unit setting zero at points of the received modulation signal other than the signal point where the correlation becomes the maximum, so that the noise component at the zero point is extracted from the received modulation signal, wherein the noise elimination unit predicts the noise component at the signal point by performing interpolation prediction based on the extracted noise component, and the noise elimination unit removing the noise component at the signal point from the received modulation signal based on the predicted noise component.

5. A noise elimination apparatus which receives a transmitted spread spectrum modulation signal, the modulation signal having a data signal and an overlapping noise component at a signal point on a time axis and having a noise component at a zero point on the time axis, the noise elimination apparatus comprising:

a timing interpolation unit performing phase equalization of the received modulation signal by using a plurality of timing interpolation filters;

a correlating filter unit generating a correlation of the modulation signal, output by the timing interpolation unit, to a spread spectrum code by using a correlating filter; and a noise elimination unit setting zero at points of the modulation signal other than the signal point where the correlation becomes the maximum, so that the noise component at the zero point is extracted from the modulation signal, wherein the noise elimination unit predicts the noise component at the signal point by performing interpolation prediction based on the extracted noise component, and the noise elimination unit removing the noise component at the signal point from the received modulation signal based on the predicted noise component.

6. A noise elimination apparatus which receives a transmitted spread spectrum modulation signal, the modulation signal having a data signal and an overlapping noise component at a signal point on a time axis and having a noise component at a zero point on the time axis, the noise elimination apparatus comprising:

a correlating filter unit generating a correlation of the received modulation signal to a spread spectrum code by using a correlating filter;

a thinning unit setting zero at points of the received modulation signal other than the signal point where the correlation becomes the maximum, so that the noise component at the zero point is extracted from the received modulation signal;

an interpolation predicting unit predicting the noise component at the signal point by performing interpolation prediction based on the extracted noise component; and a subtraction unit removing the noise component at the signal point from the received modulation signal based on the predicted noise component.

7. A noise elimination apparatus which receives a transmitted spread spectrum modulation signal, the modulation signal having a data signal and an overlapping noise component at a signal point on a time axis and having a noise component at a zero point on the time axis, the noise elimination apparatus comprising:

a correlating filter unit generating a correlation of the received modulation signal to a spread spectrum code by using a correlating filter;

a timing interpolation unit performing phase equalization of an output of the correlating filter by using a plurality of timing interpolation filters;

a thinning unit setting zero at points of the received modulation signal other than the signal point where the correlation becomes the maximum, so that the noise component at the zero point is extracted from the received modulation signal;

an interpolation predicting unit predicting the noise component at the signal point by performing interpolation prediction based on the extracted noise component; and a subtraction unit removing the noise component at the signal point from the received modulation signal based on the predicted noise component.

8. A noise elimination apparatus which receives a transmitted spread spectrum modulation signal, the modulation signal having a data signal and an overlapping noise component at a signal point on a time axis and having a noise component at a zero point on the time axis, the noise elimination apparatus comprising:

a timing interpolation unit performing phase equalization of the received modulation signal by using a plurality of timing interpolation filters;

a correlating filter unit generating a correlation of the modulation signal, output by the timing interpolation unit, to a spread spectrum code by using a correlating filter;

a thinning unit setting zero at points of the modulation signal other than the signal point where the correlation becomes the maximum, so that the noise component at the zero point is extracted from the modulation signal;

an interpolation predicting unit predicting the noise component at the signal point by performing interpolation prediction based on the extracted noise component; and a subtraction unit removing the noise component at the signal point from the received modulation signal based on the predicted noise component.

9. A noise elimination apparatus according to claim 3, wherein the noise elimination unit comprises:

a frequency shift unit receiving an input signal from the correlating filter, and performing frequency shifting based on the received input signal;

a thinning unit performing zero-point insertion to an output signal of the frequency shift unit at a timing other than a timing of the signal point;

an interpolation prediction unit outputting a noise prediction signal from an output signal of the thinning unit;

a frequency reverse shift unit performing frequency reverse shifting based on the noise prediction signal of the interpolation prediction unit; and a subtraction unit performing noise removal from the received modulation signal.

10. A noise elimination apparatus according to claim 3, wherein the noise eliminating unit comprises:

a thinning unit receiving an input signal from the correlating filter and performing zero-point insertion to the received input signal at a timing other than a timing of the signal point;

an interpolation prediction unit outputting a noise prediction signal from an output signal of the thinning unit; and a subtraction unit performing noise removal from the received modulation signal.

11. A noise elimination method, comprising the steps of:

receiving a transmitted spread spectrum modulation signal including a noise component;

generating a correlation of the received modulation signal to a spread spectrum code;

extracting the noise component at the received modulation signal other than a signal point where the correlation becomes the maximum;

predicting the noise component at the signal point by performing interpolation prediction based on the extracted noise component; and removing the noise component at the signal point from the received modulation signal based on the predicted noise component.

* * * * *